(12) United States Patent
Miyata

(10) Patent No.: US 10,529,082 B2
(45) Date of Patent: Jan. 7, 2020

(54) THREE-DIMENSIONAL GEOMETRY MEASUREMENT APPARATUS AND THREE-DIMENSIONAL GEOMETRY MEASUREMENT METHOD

(71) Applicant: Mitutoyo Corporation, Kawasaki, Kanagawa (JP)

(72) Inventor: Kaoru Miyata, Ibaraki (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 16/003,762

(22) Filed: Jun. 8, 2018

(65) Prior Publication Data

US 2018/0365847 A1    Dec. 20, 2018

(30) Foreign Application Priority Data

Jun. 20, 2017   (JP) ................................ 2017-120814
Dec. 8, 2017    (JP) ................................ 2017-236203

(51) Int. Cl.
*G06T 7/521*   (2017.01)
*G06T 7/13*    (2017.01)
*G06T 7/00*    (2017.01)
*G06T 7/60*    (2017.01)

(52) U.S. Cl.
CPC ............ *G06T 7/521* (2017.01); *G06T 7/0002* (2013.01); *G06T 7/13* (2017.01); *G06T 7/60* (2013.01)

(58) Field of Classification Search
None
See application file for complete search history.

(56) References Cited

U.S. PATENT DOCUMENTS

| 2010/0008543 | A1* | 1/2010 | Yamada ............. | G01B 11/2518 382/106 |
| 2012/0176475 | A1* | 7/2012 | Xu ..................... | G02B 21/0092 348/46 |
| 2013/0141544 | A1* | 6/2013 | Tsuyuki .............. | H04N 13/204 348/47 |
| 2014/0063192 | A1* | 3/2014 | Sonoda ............... | G01B 11/2513 348/46 |

(Continued)

FOREIGN PATENT DOCUMENTS

JP    2009-094295    4/2009

*Primary Examiner* — Reza Aghevli
(74) *Attorney, Agent, or Firm* — Rankin, Hill & Clark LLP

(57) ABSTRACT

A three-dimensional (3D) geometry measurement apparatus includes a projection part, a capturing part that generates a captured image of an object to be measured to which a projection image is projected, an analyzing part that obtains correspondences between projection pixel positions that are pixel positions of the projection image and captured pixel positions that are pixel positions of the captured image, a line identification part that identifies a first epipolar line of the capturing part corresponding to the captured pixel positions or a second epipolar line of the projection part corresponding to the projection pixel positions, a defective pixel detection part that detects defective pixels based on a positional relationship between the projection pixel positions and the first epipolar line or a positional relationship between the projection pixel positions and the second epipolar line, and a geometry identification part.

20 Claims, 22 Drawing Sheets

(56) References Cited

U.S. PATENT DOCUMENTS

| | | | |
|---|---|---|---|
| 2014/0247326 A1* | 9/2014 | Hebert | G06T 5/006 348/46 |
| 2015/0313467 A1* | 11/2015 | Sakai | A61B 3/102 351/208 |
| 2016/0054119 A1* | 2/2016 | Kanto | G01B 11/25 356/612 |
| 2016/0182873 A1* | 6/2016 | Sumiyoshi | H04N 9/3185 348/747 |
| 2016/0262608 A1* | 9/2016 | Krueger | A61B 3/0041 |
| 2016/0307325 A1* | 10/2016 | Wang | G01B 11/22 |
| 2016/0309135 A1* | 10/2016 | Ovsiannikov | H04N 5/23245 |
| 2016/0349746 A1* | 12/2016 | Grau | G05D 1/0094 |
| 2017/0108528 A1* | 4/2017 | Atlas | G01B 11/002 |
| 2017/0132784 A1* | 5/2017 | Yamada | G01B 11/25 |
| 2017/0134710 A1* | 5/2017 | Wang | G06T 7/521 |
| 2017/0248525 A1* | 8/2017 | Mayumi | G01N 21/9515 |
| 2018/0024079 A1* | 1/2018 | Yamada | G01N 23/04 378/62 |
| 2018/0113083 A1* | 4/2018 | Van Dael | G01N 23/18 |

* cited by examiner

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Pattern 1 | 0 | 0 | 0 | 0 | 0 | 0 | 0 | 0 | 1 | 1 | 1 | 1 | 1 | 1 | 1 | 1 |
| Pattern 2 | 0 | 0 | 0 | 0 | 1 | 1 | 1 | 1 | 1 | 1 | 1 | 1 | 0 | 0 | 0 | 0 |
| Pattern 3 | 0 | 0 | 1 | 1 | 1 | 1 | 0 | 0 | 0 | 0 | 1 | 1 | 1 | 1 | 0 | 0 |
| Pattern 4 | 0 | 1 | 1 | 0 | 0 | 1 | 1 | 0 | 0 | 1 | 1 | 0 | 0 | 1 | 1 | 0 |

Phase change region

THREE-DIMENSIONAL GEOMETRY MEASUREMENT APPARATUS AND THREE-DIMENSIONAL GEOMETRY MEASUREMENT METHOD

CROSS-REFERENCE TO RELATED APPLICATIONS

The present application claims priority to Japanese Patent Application number 2017-120814, filed on Jun. 20, 2017 and Japanese Patent Application number 2017-236203, filed on Dec. 8, 2017. The contents of these applications are incorporated herein by reference in its entirety.

TECHNICAL FIELD

The present invention relates to a three-dimensional geometry measurement apparatus and a three-dimensional geometry measurement method for measuring a three-dimensional geometry of an object to be measured.

BACKGROUND OF INVENTION

Methods for measuring an object to be measured without making any contact can be divided into two: a passive technique such as a stereo method; and an active technique such as a triangulation method, a time-of-flight method, and a confocal method. Among them, use of the triangulation method is increasing in various fields such as product quality management and reverse-engineering.

A light-pattern projecting method uses the principle of the triangulation method and performs a three-dimensional (3D) geometry measurement by projecting a pattern of stripes from a projector onto the object to be measured and then by capturing the pattern that changes along the geometry of the object to be measured with a camera. Japanese Unexamined Patent Application Publication No. 2009-094295 discloses a measurement apparatus for measuring a height of an electronic component based on a captured image obtained by imaging an optical cutting line when line light is projected onto the electronic component.

Because the light-pattern projecting method is capable of measuring the larger area at one time when projecting an image including a plurality of patterns of stripes on to the object to be measured, it enables a faster measurement of the 3D geometry.

In light-pattern projecting method, when a surface of the object to be measured is glossy, multiple reflections occur, that is, the projected light from the projector repeatedly reflects on a surface of the object to be measured. Due to the multiple reflections, there was a problem that measurement accuracy is reduced.

As methods to prevent the multiple reflections, a method of applying an anti-multiple-reflection spray over the surface of the object to be measured, a mask which cuts a part of the projected light from the projector in its light path, and the like have been employed. However, in the method of applying the anti-multiple-reflection spray over the surface of the object to be measured, there was a problem that the number of man-hours for rinsing increased. There was another problem that the anti-multi-reflection spray cannot be applied in an environment where a high degree of cleanness needs to be maintained.

Also, the method of using the mask is associated with a problem that the measurement time is increased since the number of times that the pattern is projected onto the object to be measured needed to be increased to cut a part of the projected light from the projector. Further, in this method, there was another problem that different masks need to be created for each individual object to be measured.

BRIEF SUMMARY OF THE INVENTION

This invention focuses on these points, and an object of the invention is to provide a three-dimensional geometry measurement apparatus and a three-dimensional geometry measurement method, which are capable of preventing a reduction of measurement accuracy caused by multiple reflections.

A three-dimensional (3D) geometry measurement apparatus according to the first embodiment of the present invention wherein the 3D geometry measurement apparatus measures a 3D geometry of an object to be measured by projecting a projection image including a stripe pattern onto the object to be measured, the apparatus includes a projection part that projects the projection image onto the object to be measured; a capturing part that generates a captured image of the object to be measured onto which the projection image is projected; an analyzing part that obtains correspondences between projection pixel positions that are pixel positions of the projection image and captured pixel positions that are pixel positions of the captured image; a line identification part that identifies a first epipolar line of the capturing part corresponding to the captured pixel positions or a second epipolar line of the projection part corresponding to the projection pixel positions; a defective pixel detection part that detects defective pixels based on a positional relationship between the projection pixel positions and the first epipolar line or a positional relationship between the projection pixel positions and the second epipolar line; and a geometry identification part that identifies the 3D geometry of the object to be measured on the basis of correspondence of pixel positions excluding the positions of defective pixels detected by the defective pixel detection part from among the correspondences obtained by the analyzing part.

A 3D geometry measurement method according to the second embodiment of the present invention wherein the 3D geometry measurement method measures a 3D geometry of an object to be measured by projecting a projection image including a stripe pattern onto the object to be measured, the method including a step of projecting the projection image onto the object to be measured, a step of generating a captured image of the object to be measured to which the projection image is projected, a step of obtaining correspondence between projection pixel positions that are pixel positions of the projection image and a captured pixel positions that are pixel positions of the captured image, a step of identifying a first epipolar line of a capturing part corresponding to the captured pixel positions or a second epipolar line of a projection part corresponding to the projection pixel positions, the capturing part generating the captured image of the object to be measured and the projection part projecting the projection image onto the object to be measured, a step of detecting a defective pixel on the basis of a positional relationship between the projection pixel position and the first epipolar line or a positional relationship between the projection pixel position and the second epipolar line, and a step of identifying the 3D geometry of the object to be measured on the basis of correspondence of pixel positions excluding the positions of defective pixels detected from among the correspondences being obtained.

BRIEF DESCRIPTION OF THE DRAWINGS

FIG. 11 shows examples of Gray codes corresponding to the binary stripe patterns shown in FIGS. 4C to 4F.

DETAILED DESCRIPTION OF THE INVENTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

First Embodiment

<Outline of 3D Geometry Measurement Apparatus 100>

Figure 1A:
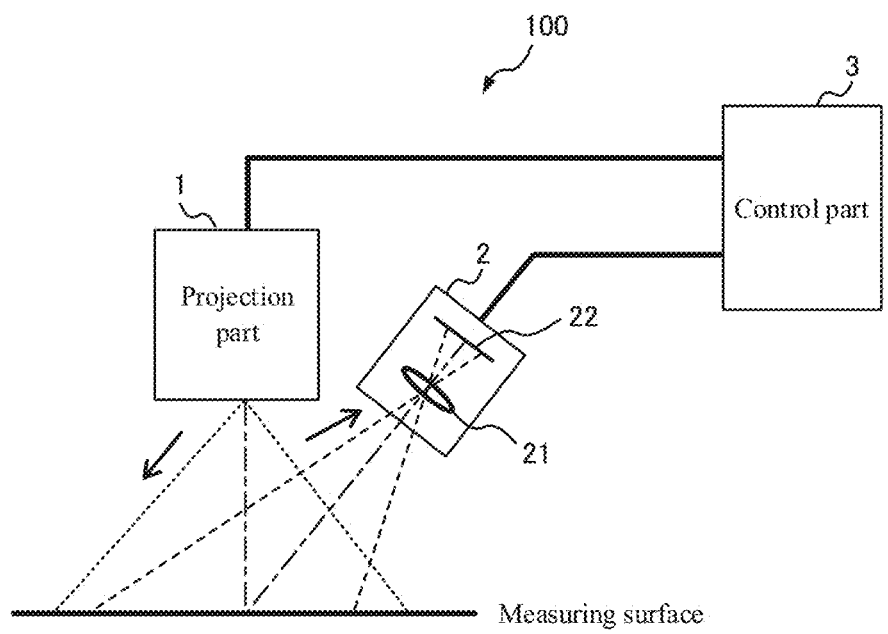
FIGS. 1A to 1C illustrate the outline of a 3D geometry measurement apparatus according to the first embodiment.
Figure 1B:
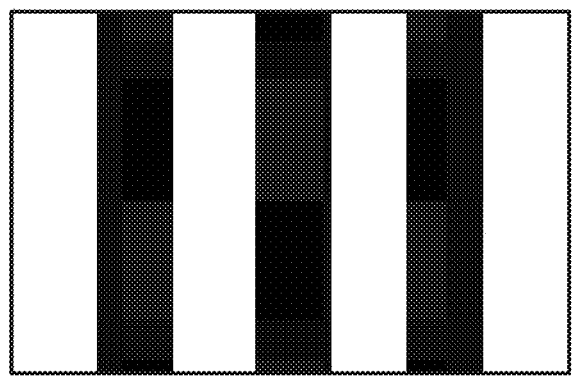
Figure 1C:
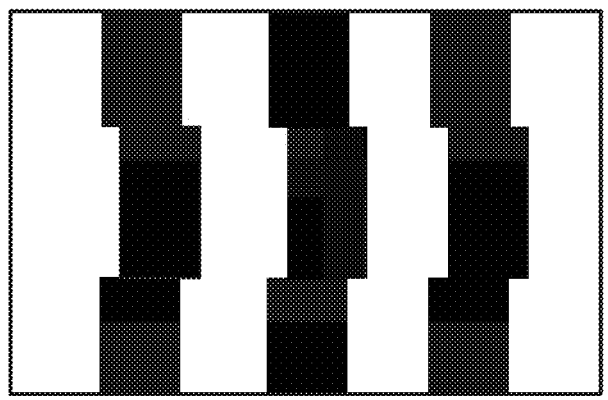

FIGS. 1A to 1C illustrate the outline of a 3D geometry measurement apparatus 100 according to the present embodiment. FIG. 1A shows a configuration of the 3D geometry measurement apparatus 100. The 3D geometry measurement apparatus 100 has a projection part 1, a capturing part 2, and a control part 3.

The projection part 1 is a projection apparatus having a light source such as a light emitting diode, laser, or the like and projects a plurality of respectively different projection images including stripe patterns onto a measuring surface of an object to be measured. The capturing part 2 is a capturing apparatus that has a lens 21 and an imaging element 22. The capturing part 2 generates a plurality of captured images by respectively capturing the object to be measured while the projection images are sequentially projected onto the object to be measured by the projection part 1. The capturing part 2 is placed in such a manner that the optical axis of the capturing part 2 and the optical axis of the projection part 1 form a predetermined angle. The control part 3 measures a geometry of the object to be measured based on the captured images generated by the capturing part 2. The control part 3 can be implemented by a computer, for example.

FIGS. 1B and 1C each show an example of a captured image generated by the capturing part 2 while the projection part 1 projects the projection images onto the object to be measured. As shown in FIGS. 1B and 1C, the projection part 1 projects the projection images including binary stripe patterns onto a target for measurement. FIG. 1B shows the captured image generated by the capturing part 2 when the projection part 1 projects the projection images including the binary stripe patterns onto an even measuring surface. The white regions represent the light projection regions and the black regions represent the no-projection regions. When the measuring surface has no irregularities, the binary stripe patterns of the captured image generated by the capturing part 2 match with the binary stripe patterns of the projection image.

FIG. 1C shows a captured image generated by the capturing part 2 when the projection part 1 projects the binary stripe patterns onto a measuring surface having convex portions. In the captured image of FIG. 1C, the image of a part of the binary stripe patterns is deformed. In the captured image, the image of the binary stripe patterns is deformed by an amount according to the height of the convex portions. Therefore, the 3D geometry measurement apparatus 100 can measure the geometry of the object to be measured by identifying the height of each location of the convex portion based on the amount of deformation in the binary stripe patterns image in the captured image.

Figure 2A:
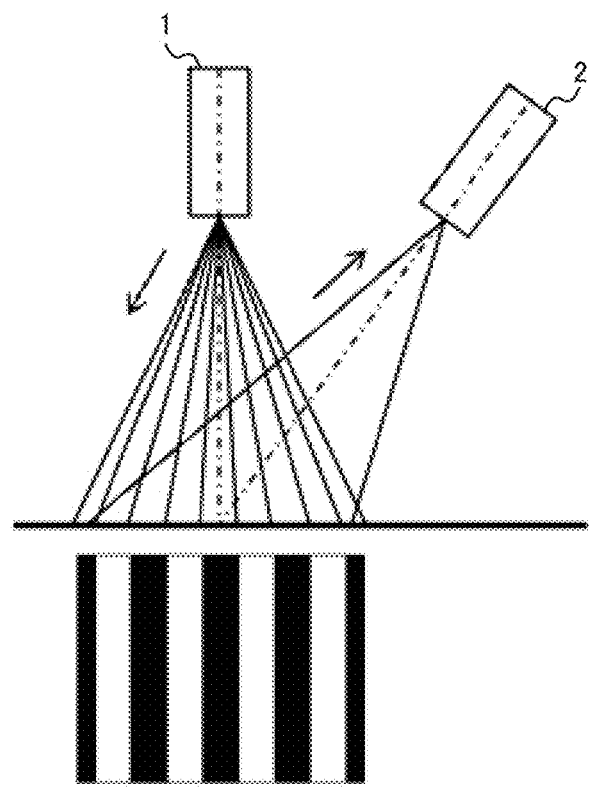
FIGS. 2A and 2B each show a projection image which a projection part projects onto an object to be measured.
Figure 2B:
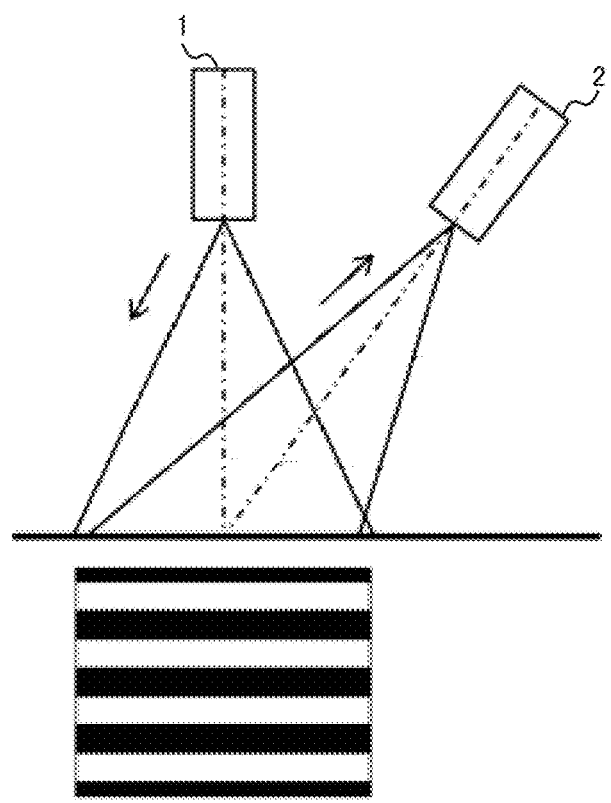

FIGS. 2A and 2B each show a projection image which the projection part 1 projects onto the object to be measured. FIG. 2A shows an example of binary stripes pattern extending in the first direction, and FIG. 2B shows an example of binary stripe patterns extending in the second direction. The projection part 1, as shown in FIG. 2A, projects the binary stripe patterns extending in the first direction (this may be referred to as a vertical pattern below). The first direction is a direction orthogonal to the optical axis of the projection part 1 and is a direction orthogonal to the optical axis of the capturing part 2. The projection part 1, as shown in FIG. 2B, projects the binary stripe patterns extending in the second direction (this may be referred to as a horizontal pattern below). The second direction is a direction parallel to a plane including the optical axes of the projection part 1 and the capturing part 2.

When the stripe patterns are projected onto the object to be measured, the stripe patterns deviate in the width direction in accordance with the 3D geometry of the object to be measured, as shown in FIG. 1C.

Also, the width of the stripe patterns fluctuates in accordance with the 3D geometry of the object to be measured. In the first captured image with the stripe pattern extending in the first direction, the direction that causes the deviation of an orientation of the optical axes of the projection part 1 and the capturing part 2 and the direction in which the deviation in the width direction of the stripe patterns and the like occurred match one another. That is, (i) a direction of an image for a line segment generated by projecting a line segment connecting the projection part 1 and the capturing part 2 onto a plane where the object to be measured is placed and (ii) the direction in which the deviation in the width direction of the stripe patterns and the like occurred match one another. Therefore, in the first captured image, the sensitivity to detect the deviation of the stripe patterns in the width direction and the like is high. For this reason, resolution is improved in the measurement of the 3D geometry of the object to be measured.

Meanwhile, in the second captured image with the stripe pattern extending in the second direction, (i) the direction that causes the deviation of the orientation of the optical axes of the projection part 1 and the capturing part 2 and (ii) the direction in which the deviation or the like in the width direction of the stripe patterns occurred are orthogonal to one another. That is, the direction of an image for the line segment generated by projecting the line segment connecting the projection part 1 and the capturing part 2 onto the plane where the object to be measured is placed and the direction in which the deviation in the width direction of the stripe patterns and the like occurred are orthogonal. Therefore, the measurement resolution of the second captured image is significantly lowered in the measurement of the 3D geometry of the object to be measured, as compared with the first captured image, and the 3D geometry measurement apparatus 100 cannot accurately measure the geometry.

The 3D geometry measurement apparatus 100 obtains the 3D geometry of the object to be measured by analyzing the stripe pattern projected on the object to be measured. However, when the surface of the object to be measured is glossy, there was a problem that measurement accuracy is reduced due to the multiple reflections caused by a projected light from the projection part 1 being multiply reflected. Therefore, the 3D geometry measurement apparatus 100 detects defective pixels affected by the multiple reflections by respectively capturing the object to be measured while a stripe pattern extending in the first direction and a stripe pattern extending in the second direction are projected onto the object to be measured, and by analyzing the captured images.

Figure 3:
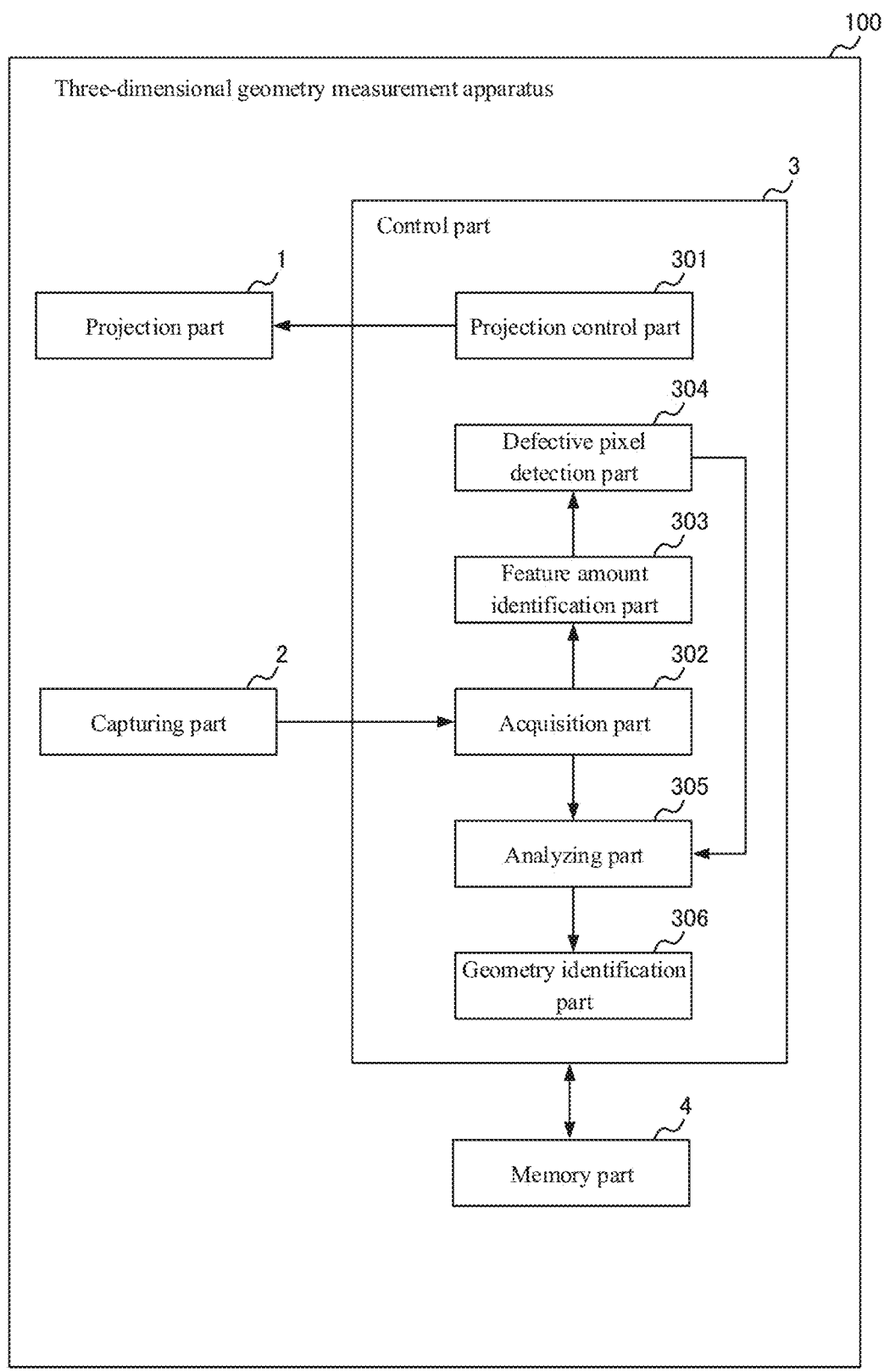
FIG. 3 shows a configuration of the 3D geometry measurement apparatus.

FIG. 3 shows a configuration of the 3D geometry measurement apparatus 100. The 3D geometry measurement apparatus 100 has the projection part 1, the capturing part 2, the control part 3, and a memory part 4. The memory part 4 includes a memory medium including a hard disk, a read only memory (ROM), a random access memory (RAM), and the like. The memory part 4 stores programs to be executed by the control part 3. The control part 3 is, for example, a central processing unit (CPU) and functions as a projection control part 301, an acquisition part 302, a feature amount identification part 303, a defective pixel detection part 304, an analyzing part 305, and a geometry identification part 306 by executing the programs stored in the memory part 4.

The projection control part 301 generates control signals for projecting the projection images including a stripe pattern onto the object to be measured and inputs the generated control signals into the projection part 1. Hereinafter, types of stripe patterns which the projection control part 301 projects will be explained by referring to FIGS. 4A to 4F and FIGS. 5A to 5D.

[Types of Stripe Patterns]

FIGS. 4A to 4F respectively show examples of types of projection images which a projection control part 301 projects. In FIGS. 4A to 4F, the black regions represent regions where the projection part 1 does not project light (hereinafter referred to as the "no-projection regions"), and the white regions represent regions where the projection part 1 projects light (hereinafter referred to as the "light-projection regions").

Figure 4A:
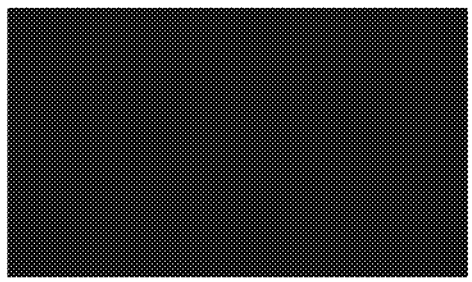
FIGS. 4A to 4F respectively show examples of types of projection images which a projection control part projects.
Figure 4B:
Figure 4C:
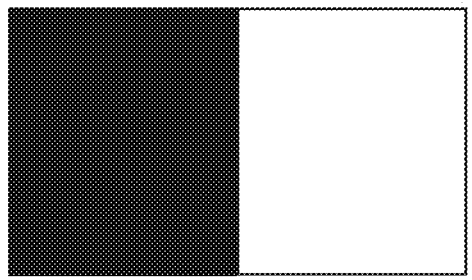
Figure 4D:
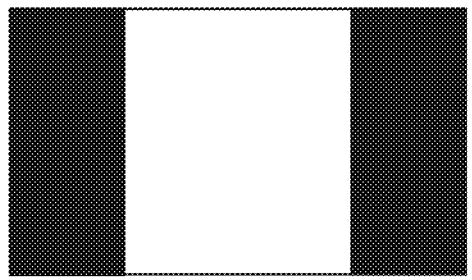
Figure 4E:
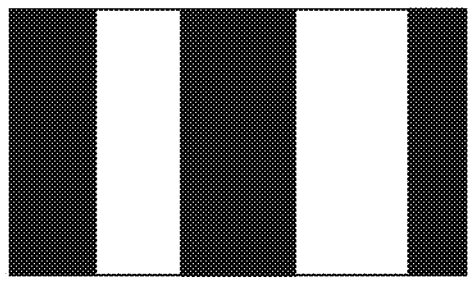
Figure 4F:
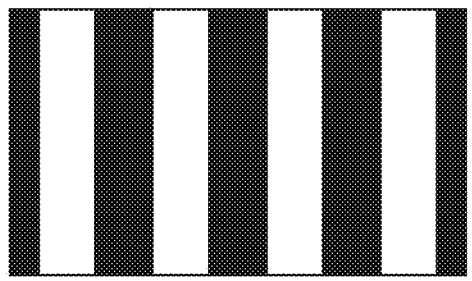

FIG. 4A shows a standard projection pattern by which light is not projected onto any part of the object to be measured (i.e. an all-black pattern). FIG. 4B shows a standard projection pattern by which light is projected onto the entire object to be measured (i.e. an all-white pattern). FIGS. 4C to 4F show the binary stripe patterns, which are composed of a light-projection region and a no-projection region and in which the stripes that have a different width for each projection image are arranged in the same direction. The stripe patterns shown in FIGS. 4A to 4F correspond to Gray codes and are used for identifying positions of pixels in the captured image. Details will be described below.

FIGS. 5A to 5D respectively show examples of gradation stripe patterns having sinusoidal luminance distributions. While the binary stripe patterns shown in FIGS. 4C to 4F are binary images that are composed of the black regions and the white regions, in the gradation stripe patterns shown in FIGS. 5A to 5D, luminance changes in a sinusoidal manner from the white region to the black region along the width direction of the stripes. Intervals between the stripes in the gradation stripe patterns of FIGS. 5A to 5D are constant, and spatial frequency of the stripes in the gradation stripe patterns is, for example, four times the spatial frequency of the binary stripe patterns of FIG. 4F.

The gradation stripe patterns of FIGS. 5A to 5D are different from each other in the point that the phases of the sine waves indicating the luminance distribution differ by 90 degrees from each other, and their luminance distributions are otherwise the same. In the present embodiment, the projection control part 301 projects a total of ten pieces of the projection images: two standard patterns shown in FIGS. 4A and 4B, four binary stripe patterns shown in FIGS. 4C to 4F, and four gradation stripe patterns shown in FIGS. 5A to 5D. The gradation stripe patterns shown in FIGS. 5A to 5D, together with the stripe patterns shown in FIGS. 4A to 4F, are used for identifying the positions of pixels in the captured image.

Figure 5A:
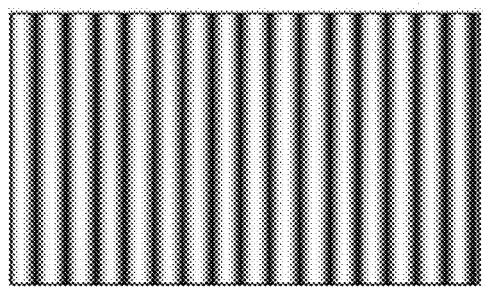
FIGS. 5A to 5D respectively show examples of gradation stripe patterns having sinusoidal luminance distributions.
Figure 5B:
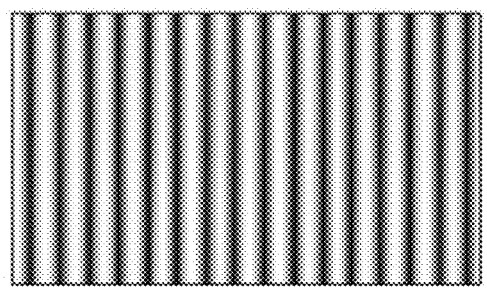
Figure 5C:
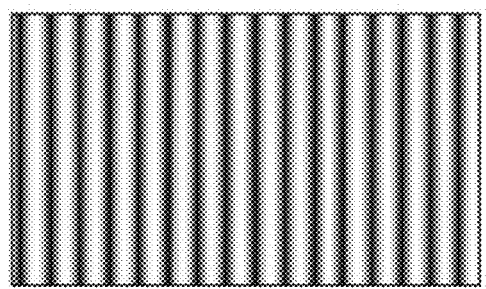
Figure 5D:
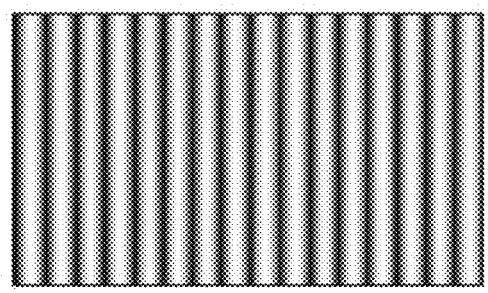
Figure 6:
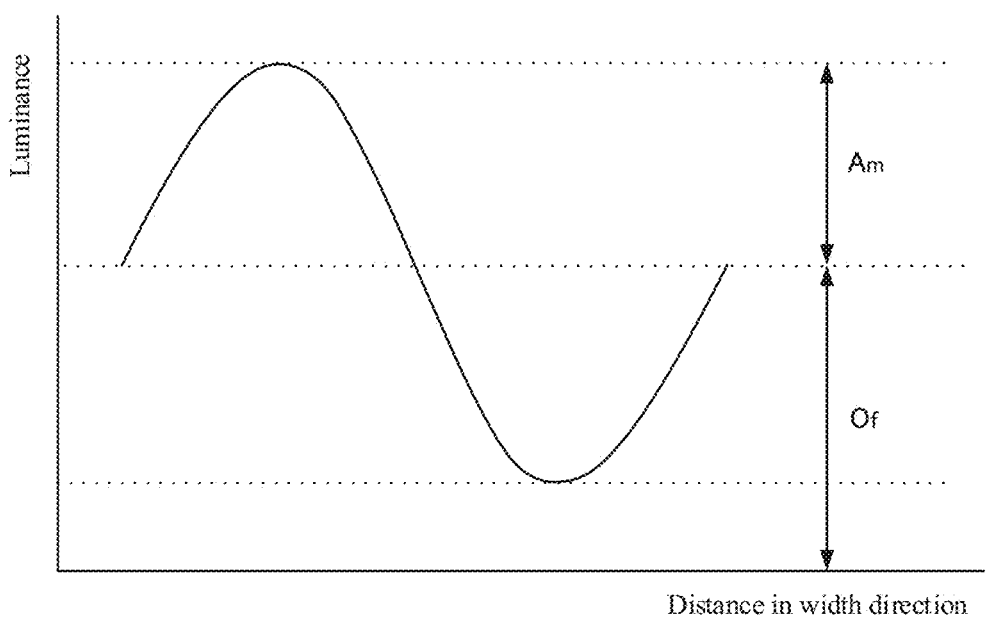
FIG. 6 illustrates a feature amount to be identified by a feature amount identification part.

The acquisition part 302 shown in FIG. 3 acquires the captured image generated by the capturing part 2. The feature amount identification part 303 identifies a feature amount indicating the features of stripe patterns included in the captured image acquired by the acquisition part 302. By referring to FIG. 6, the feature amount identified by the feature amount identification part 303 will be described. FIG. 6 shows the luminance distribution of the captured images generated by the capturing part 2 while the gradation stripe patterns are projected onto the object to be observed as shown in FIG. 5A. In FIG. 6, the horizontal axis 6 indicates a distance in the width direction of gradation stripe patterns and the vertical axis indicates luminance of gradation stripe patterns. As shown in FIG. 6, the luminance distribution of the gradation stripe patterns in FIG. 5A takes a sinusoidal waveform. The feature amount identification part 303 identifies, as the feature amount, an amplitude $A_m$ of the sinusoidal wave of the luminance distribution of the gradation stripe patterns, an offset $O_f$ which is the sum of the minimum value and the amplitude of luminance, a contrast which is a ratio $(A_m/O_f)$ of the amplitude $A_m$ to the offset $O_f$, or the distortion or the like of the sinusoidal waveform. The amplitude is the feature amount used for determining the absolute value of the luminance. Also, by using the nominalized value of the contrast and the nominalized value of distortion, the feature amount identification part 303 can make these values to be an amount which hardly depends on an exposure time or the like of a camera.

[Regarding Multiple Reflections]

The defective pixel detection part 304 detects defective pixels of the captured image affected by the multiple reflections. Specifically, the defective pixel detection part 304 detects the defective pixels by determining whether the feature amount identified by the feature amount identification part 303 is within a predetermined range. The defective pixels are pixels having luminance that, being affected by the multiple reflections, is different from the luminance of direct reflection light.

Figure 7A:
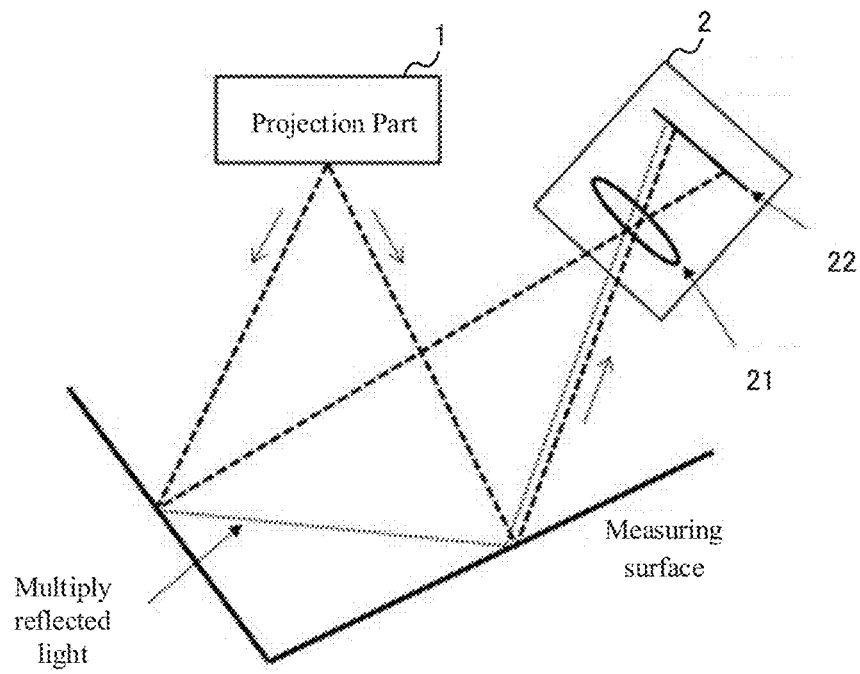
FIGS. 7A and 7B each illustrate multiple reflections.
Figure 7B:
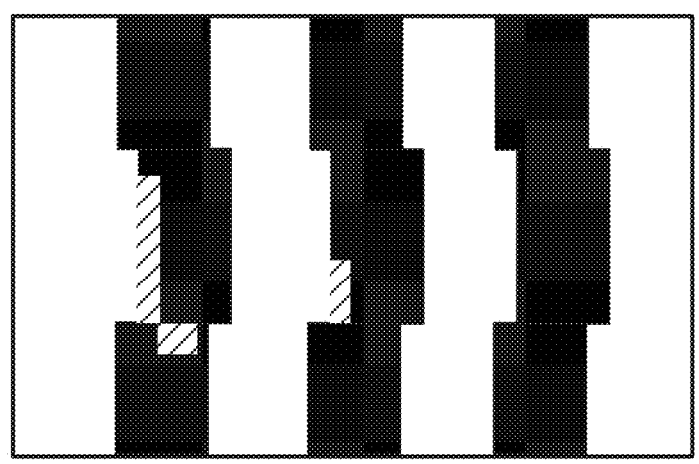

By referring to FIGS. 7A and 7B, multiple reflections will be described. FIGS. 7A and 7B illustrate multiple reflections. When the object to be measured is glossy and has a complicated shape, light emitted by the projection part 1 may enter the capturing part 2 after being repeatedly reflected multiple times on the surface to be measured. In this case, as shown in FIG. 7A, the light emitted by the projection part 1 enters one pixel of the imaging element 22 via two or more paths.

Specifically, the light entering the imaging element 22 includes direct light, which is the light emitted by the projection part 1 and which directly enters the capturing part 2 after being diffused and reflected on the surface to be measured, and multiply reflected light, which enters the capturing part 2 after being subjected to multiple reflections. As a result, in the captured image captured by the capturing part 2, a pixel having a luminance value corresponding to black when there is no multiply reflected light may have a luminance value corresponding to white. In particular, the multiple reflection is likely to occur when the object to be measured contains metal or the like which is likely to cause random reflection.

FIG. 7B illustrates an example of the captured image affected by the multiple reflections. FIG. 7B corresponds to FIG. 1C, but due to the influence of light, the shaded portions have luminance which is different from the luminance in FIG. 1C. Also, due to the influence of light, distortion or the like may occur in the sinusoidal waveform showing the luminance distribution shown in FIG. 6.

The defective pixel detection part 304 detects the defective pixels based on the feature amounts of the stripe patterns identified by the feature amount identification part 303. For example, the defective pixel detection part 304 determines whether the feature amount is within the predetermined range and detects a pixel whose feature amount falls outside the predetermined range as the defective pixel. The predetermined range is, for example, a range of values assumed to be the feature amount, such as the amplitude $A_m$, the contrast, and the waveform distortion or the like when there is no influence of multiply reflected light.

Figure 8A:
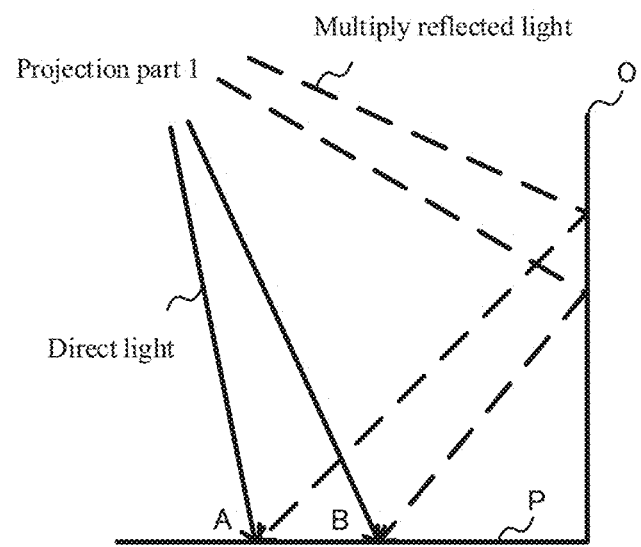
FIGS. 8A and 8B each illustrate multiply reflected light on a groove of the object to be measured.
Figure 8B:
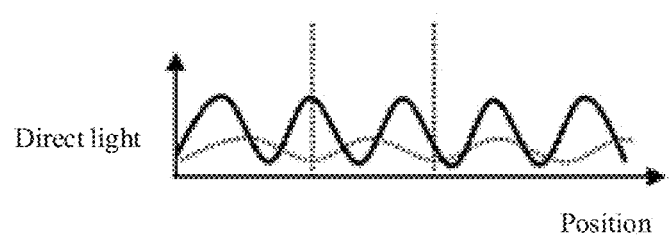

FIGS. 8A and 8B each illustrate multiply reflected light in a groove of the object to be measured. FIG. 8A shows a plurality of paths of the projected light. FIG. 8B shows the luminance distribution of the direct light and the multiply reflected light on a plane P of the object to be measured. In FIG. 8A, the solid lines indicate the direct light and the broken lines indicate the multiply reflected light. On the depth side of the groove, a distance of the projected light reflected at one position of the object to be measured reaching another position of the object to be measured is relatively small.

For example, in FIGS. 8A and 8B, a difference between (i) a light path of direct light which directly reaches the position A or the position B on the plane P of the object to be measured and (ii) a light path of multiply reflected light which reaches the position A or the position B after being reflected on the plane O of the object to be measured is relatively small on the depth side of the groove. When the difference between the light paths of the direct light and the multiply reflected light is small, the influence of multiply reflected light is great because a difference between intensities of the direct light and the multiply reflected light is great. Also, when the difference between the light paths of the direct light and the multiply reflected light is small, the multiply reflected light has the same period as the direct light. In this case, a distortion is not likely to occur in synthetic light, in which the direct light and the multiply reflected light are combined. For this reason, the defective pixel detecting part 304 may be unable to detect a pixel as the defective pixel even though the pixel has been influenced by the multiply reflected light.

Here, when the defective pixel detection part 304 detects one pixel as the defective pixel, even though pixels near that pixel are not detected as the defective pixels, it is thought that the peripheral pixels are also highly likely to be affected by the multiply reflected light. In view of this, the defective pixel detection part 304 may assume, as the defective pixels, pixels included in a range from the defective pixel to a distance corresponding to one cycle of the stripes on both sides of the defective pixel. This reduces the probability that the defective pixel detection part 304 fails to detect the defective pixel. In this way, the influence of the multiply reflected light in the geometry identification result of the geometry identification part 306 can be further reduced. For example, if the geometry identification part 306 identifies the groove of the object to be measured, the defective pixel detecting part 304 detects, as the estimated defective pixels, the pixels included in the range from the defective pixel to a distance corresponding to one cycle of the stripes on both sides of that defective pixel. Then, the geometry identification part 306 newly identifies the geometry based on the estimated defective pixels. Accordingly, identification accuracy of the geometry can be improved.

[Change in the Feature Amount Due to Multiply Reflected Light]

Figure 9A:
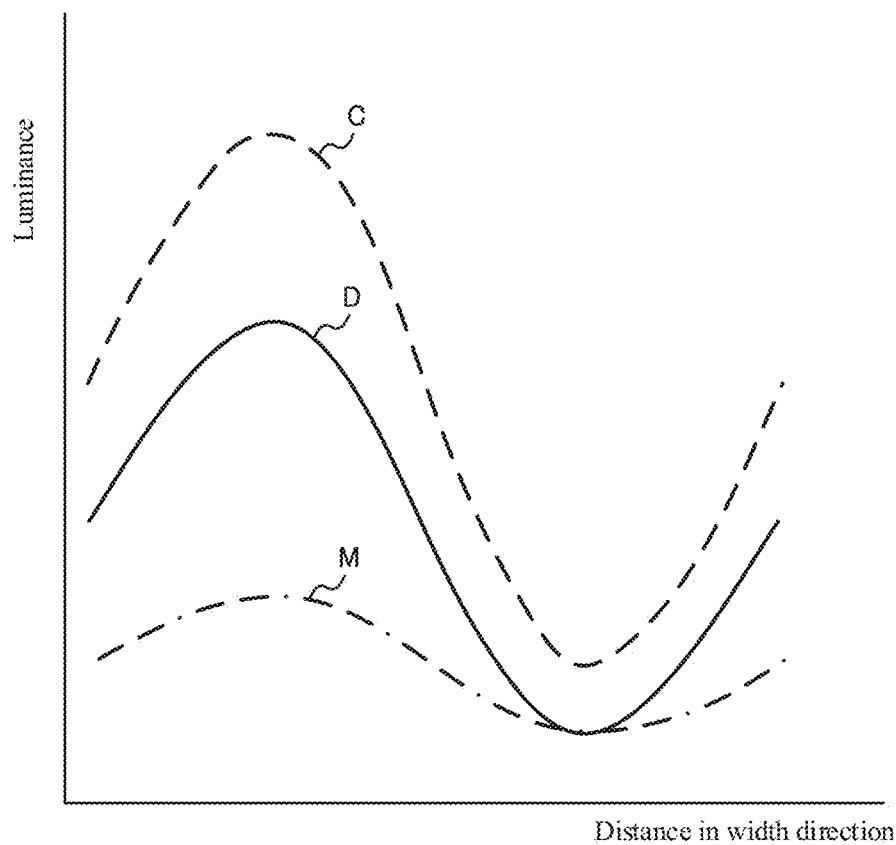
FIGS. 9A and 9B each illustrate change in the feature amount of the gradation stripe patterns on a captured image due to multiply reflected light.
Figure 9B:
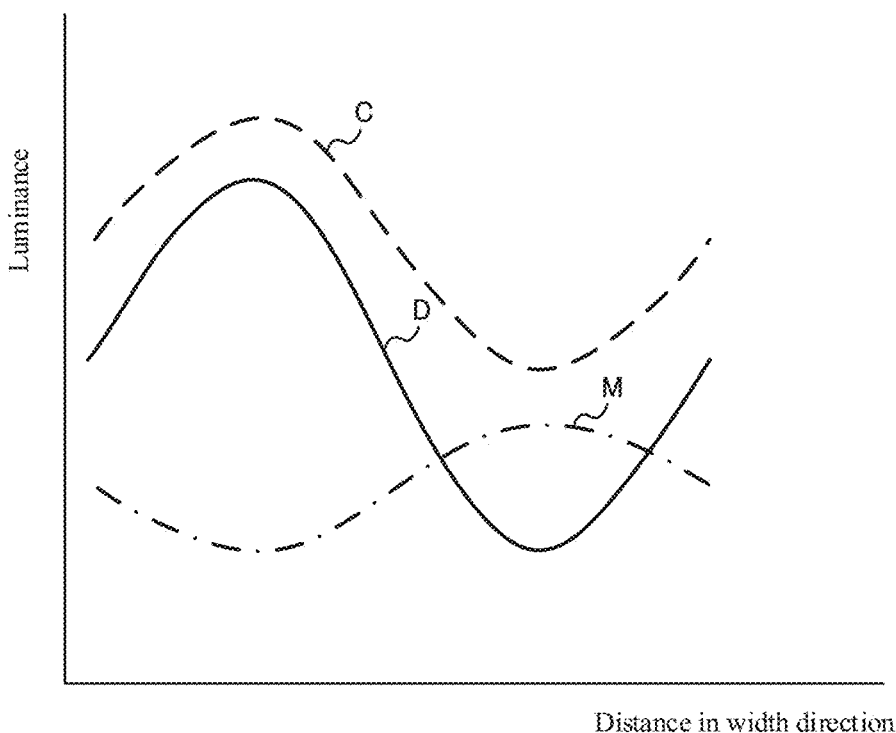

FIGS. 9A and 9B each illustrate change in the feature amount of the gradation stripe patterns on a captured image due to multiply reflected light. By referring to FIGS. 9A and 9B, change in the feature amount of the gradation stripe patterns on the captured image due to the multiply reflected light will be described. FIGS. 9A and 9B are graphs showing changes in a direct-light luminance distribution D and a multiply reflected light luminance distribution M. The horizontal axes of FIGS. 9A and 9B each indicate a distance in the width direction of gradation stripe patterns of the captured image and the vertical axes of FIGS. 9A and 9B indicate luminance. The solid lines indicate the direct-light luminance distribution D, and the one-dot chain lines indicate the multiply reflected light luminance distribution M. The broken lines indicate a synthetic-light luminance distribution C, a distribution of synthetic light in which the direct light and the multiply reflected light are combined.

The feature amount such as amplitude, contrast, and the like of the gradation stripe patterns is represented by the synthetic-light luminance distribution C. This luminance distribution C is a luminance distribution obtained by combining the direct-light luminance distribution D and the multiply reflected light luminance distribution M.

As shown in FIG. 9A, when the phases of the direct-light luminance distribution D and the multiply reflected light luminance distribution M are close, an amplitude $A_m$ of the synthetic-light luminance distribution C is larger than an amplitude $A_m$ of the direct-light luminance distribution D. On the other hand, as shown in FIG. 9B, when a deviation in the phase between the direct-light luminance distribution D and the multiply reflected light luminance distribution M is large, the amplitude $A_m$ of the synthetic-light luminance distribution C is smaller than the amplitude $A_m$ of the direct-light luminance distribution D. As such, the feature amount of the synthetic-light luminance distribution C fluctuates in accordance with the phase relation between the direct light and the multiply reflected light. For this reason, there may be a case where the defective pixel detection part 304 is unable to detect the presence of the multiply reflected light by determining whether the amplitude $A_m$ is within the predetermined range using only one gradation stripe pattern.

Also, when the lower limit value of an amplitude $A_m$ of the gradation stripe patterns for eliminating the influence of multiply reflected light is set to be high, there is a problem that the defective pixel detection part 304 may even detect pixels in which subsurface scattering is occurring as the defective pixels. In the subsurface scattering, light penetrates the surface of the object to be measured after the projected light from the projection part 1 that entered and was scattered in the inside of the object to be measured when the objected to be measured contains ceramic, plastic or the like. When the subsurface scattering occurs, the amplitude is attenuated. The same problem occurs with the contrast, but the problem seldom occurs with the waveform distortion.

Also, when differences of phase and cycle between the direct-light luminance distribution D and the multiply reflected light luminance distribution M are relatively small, it is difficult for the defective pixel detection part 304 to detect the distortion of the waveform. For this reason, the defective pixel detection part 304 cannot detect the multiply reflected light sufficiently by the distortion of the waveform of one gradation stripe pattern.

Therefore, when the feature amount identification part 303 sets a feature amount identified from the first captured image with the stripe pattern extending in the first direction to the first feature amount and sets a feature amount identified from the second captured image with the stripe pattern extending in the second direction to the second feature amount, the defective pixel detection part 304 detects the defective pixels of the first captured image affected by multiple reflections based on the first feature amount and the second feature amount. For example, the defective pixel detection part 304 first detects pixels of the first captured image whose first feature amount falls outside a predetermined range as the defective pixels. The predetermined range is a range of values assumed to be the first and the second feature amounts such as the amplitude $A_m$, the contrast, and the waveform distortion or the like when there is no influence of multiply reflected light.

Because the pixels that correspond to each other in the first captured image and the second captured image are the pixels of different stripe patterns projected on the same position of the object to be measured, it is more likely that the influence of multiply reflected light may be occurring in the first image at the position of the second captured image where the influence of multiply reflected light has been occurring. Therefore, the defective pixel detection part 304 identifies the pixels of the first captured image corresponding to the pixels of the second captured image whose second feature amount falls outside the predetermined range and detects the identified pixels of the first captured image as the defective pixels.

Also, the first range for detecting the defective pixels based on the first feature amount and the second range for detecting the defective pixels based on the second feature amount may be different. For example, the defective pixel detection part 304 detects the pixels of the first captured image whose first feature amount falls outside the first range as the defective pixels and detects the pixels of the second captured image whose second feature amount falls outside the second range as the defective pixels. Further, the defective pixel detection part 304 identifies the pixels of the first captured image corresponding to the pixels of the second captured image identified as the defective pixels and detects these pixels as the defective pixels. The first range and the second range are the respective ranges of values assumed to be the first and the second feature amounts, such as the amplitude $A_m$, the contrast, and the offset $O_f$ or the like when there is no influence of multiply reflected light.

In the second captured image, as shown in FIG. 2B, the width of the stripe patterns of the captured image is not likely to fluctuate due to the 3D geometry of the object to be measured, because (i) the direction that causes the deviation of the orientation of the optical axes of the projection part 1 and the capturing part 2 and (ii) the direction in which the fluctuation of width of the stripe patterns occurred are orthogonal to one another. For this reason, the second range for the defective pixel detection part 304 to determine whether the second feature amount of the second captured image is the defective pixel or not may be set to be narrow compared to the first range. By adopting this configuration, the accuracy of detecting defective pixels can be improved.

Also, the defective pixel detection part 304 may detect a pixel whose difference between the first feature amount and the second feature amount falls outside the predetermined range as the defective pixel by comparing the first and the second feature amounts. To be more specific, the defective pixel detection part 304 compares the first and the second feature amounts for a plurality of types of feature amounts of the amplitude, the contrast and the like. For example, the defective pixel detection part 304 detects, as the defective pixels, pixels whose difference between the first and the second feature amount falls outside the predetermined range for any one of the amplitude, the contrast and the like.

Also, the defective pixel detection part 304 may specify for each pixel a predetermined region in the captured image of the stripe patterns extending in the first direction and the second direction, obtain a similarity between the first and the second feature amounts of the pixels within the specified region, and compare the obtained similarity with a threshold value. For example, the defective pixel detection part 304 may set a difference between the average value of the first feature amount and the average value of the second feature amount within the specified region to be the degree of similarity. Also, the defective pixel detection part 304 may calculate spatial variation (differential amount) of the feature amount for the first and the second feature amounts within the specified region and set the obtained difference to be the similarity. In this way, the defective pixel detection part 304 can detect the influence of multiple reflections more prominently. The threshold value is the lower limit value of a value of amplitude $A_m$ or the like being assumed to be the similarity between the first and the second feature amounts with no influence of multiply reflected light. When the similarity between the first and the second feature amounts is lower than the threshold value, the defective pixel detection part 304 detects the pixels within the specified region as the defective pixels. On the other hand, when the similarity between the first and the second feature amounts is equal to or more than the threshold value, the defective pixel detection part 304 does not detect the pixels within the specified region as the defective pixels

[Calculation Method of the Feature Amount Based on a Captured Image]

Figure 10:
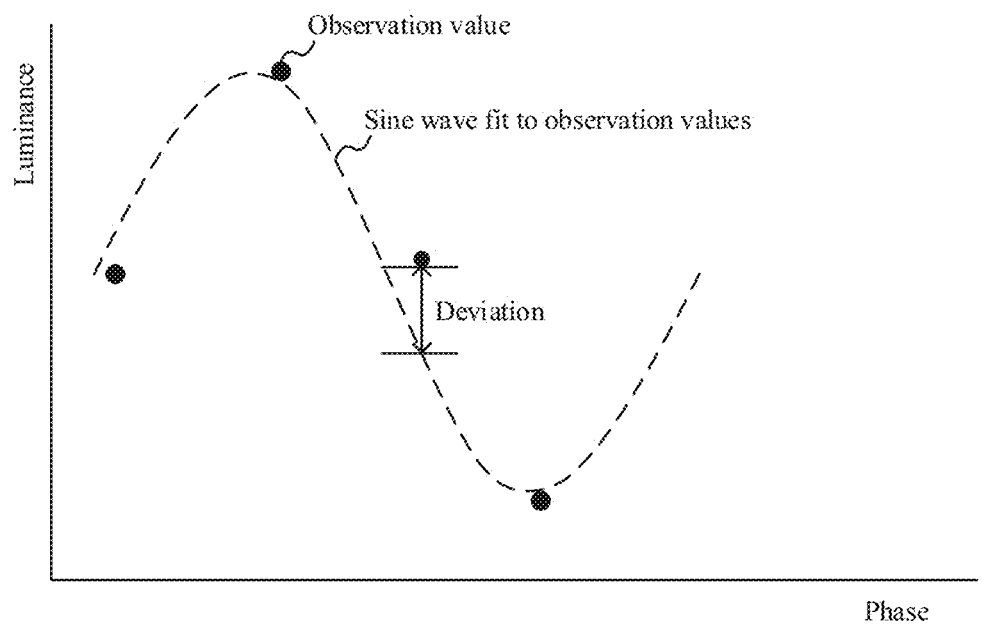
FIG. 10 illustrates a method of calculating the feature amount based on a captured image.

FIG. 10 illustrates a method for calculating the feature amount (waveform distortion) based on a captured image. The horizontal axis of FIG. 10 indicates the luminance of the same pixel obtained in the captured image while the gradation stripe patterns of FIGS. 5A to 5D are projected onto the object to be observed. The vertical axis of FIG. 10 indicates the phase corresponding to the gradation stripe patterns of FIGS. 5A to 5D. Each black circle in FIG. 10 corresponds to the observation value of the luminance of the same pixel when the gradation stripe patterns of FIGS. 5A to 5D are sequentially projected onto the object to be measured. The broken line in FIG. 10 indicates a sine wave fit to the observation values represented by each black circle. A difference between the luminance corresponding to each black circle and the luminance of sine wave in the same phase is equivalent to a deviation from the ideal value of the observation value. The feature amount identification part 303 can normalize the magnitude of the waveform distortion by accumulating the deviation corresponding to each observation value, and by normalizing the accumulated deviations with the amplitude.

The projection control part 301 sequentially projects the gradation stripe patterns of FIGS. 5A to 5D onto the object to be measured. Then, the capturing part 2 respectively generates the captured images of the object to be measured that are captured while the projection control part 301 sequentially projects the gradation stripe patterns of FIGS. 5A to 5D. The phases of gradation stripe patterns of FIGS. 5A to 5D differ from each other by 90 degrees. For this reason, the feature amount identification part 303 plots the luminance of the identified pixels of the captured image, corresponding to the gradation stripe patterns of FIGS. 5A to 5D, on the graph of FIG. 10 being shifted by 90 degrees each.

To create the sine wave shown in FIG. 10, the feature amount identification part 303 normalizes the luminance value $l_n(x, y)$, which is the observation value at the time of projecting each gradation stripe pattern, by the following expression, where n denotes step number (n=1 to N), and N denotes the number of steps indicating the number of projection images which include the gradation stripe patterns extending in the same direction.

$$K_n(x, y) = \frac{l_n(x, y) - A(x, y)}{B(x, y)}$$

Further, the feature amount identification part 303 identifies a sine wave having the highest matching rate with each plotted point, as indicated by the broken line in FIG. 10. The feature amount identification part 303 obtains the sine wave by obtaining the phase $\psi(x, y)$ from the luminance value $l_n(x, y)$ in each pixel (x, y) using the following expression:

$$L_n(x, y) = \cos\left\{\varphi(x, y) + \frac{2\pi n}{N}\right\}$$

In this case, the feature amount identification part 303 obtains a deviation between the plotted luminance of respective gradation stripe patterns and the identified sine wave by the following expression. The deviation is the feature amount for detecting the distortion or the like of the sinusoidal waveform.

$$E = \sqrt{\frac{\sum_{i=1}^{n}(K_n(x, y) - L_n(x, y))^2}{N}}$$

The defective pixel detection part 304 compares the deviation to the threshold value and detects the defective pixels when the deviation is larger than the threshold value. This threshold value is the maximum value of the deviation assumed to occur in pixels having no influence from the multiply reflected light. On the other hand, the defective pixel detection part 304 does not detect a defective pixel when the deviation is equal to or smaller than the threshold value.

[Identifying a Position of a Pixel of a Captured Image]

The analyzing part 305 identifies correspondence between a pixel of the projection image and a pixel of the captured image acquired by the acquisition part 302 by analyzing gradation information of gradation stripe patterns of the captured image. The correspondence is represented by information that shows the position (or a coordinate) of the pixel of the projection that corresponds to a pixel of the captured image. If a pixel A of the captured image is a pixel obtained by capturing a pixel B of the projection image, the pixel A and the pixel B have correspondence with each other. The method for obtaining correspondence between the pixels of the projection image and the captured image will be described below.

As described above, the binary stripe patterns shown in FIGS. 4C to 4F correspond to Gray codes. In FIG. 11, examples of binary stripe patterns shown in FIGS. 4C to 4F are shown. By associating 0 s in the Gray codes with the no-projection regions and 1 s with the light-projection regions, the binary stripe patterns shown in FIGS. 4C to 4F are generated.

Each position in the x-direction in FIGS. 4A to 4F and FIG. 11 is represented by a code value, which is the combination of the numbers 0 or 1 at the respective positions in the Gray codes. Position 0 in FIG. 11 corresponds to the code value of "0000," position 1 corresponds to the code value of "0001" and position 15 corresponds to the code value of "1000."

In the projection control part 301, the capturing part 2 captures the object to be measured while the standard patterns shown in FIGS. 4A and 4B are respectively projected onto the object to be measured. The analyzing part 305 obtains, for each pixel, an average value of two captured standard patterns as a median value. Similarly, regarding the captured images captured while the binary stripe patterns of FIGS. 4C to 4F are projected onto the object to be measured, the analyzing part 305 identifies the code values of respective pixels by comparing the luminance values of respective pixels in four captured images with corresponding median values. By identifying the code values, the analyzing part 305 can identify which binary stripe is reflected at each pixel position from among the binary stripe patterns projected toward different positions.

Further, the analyzing part 305 identifies a pixel position of the projection image that matches the phase of the sine wave identified by the feature amount identification part 303 as shown in FIG. 10. Because the gradation stripe patterns of the projection image have periodicity, there are a plurality of pixel positions of the projection image that match the identified phase of the sine wave.

Therefore, the analyzing part 305 obtains correspondence between the pixels of the projection images of the binary stripe patterns of FIGS. 4C to 4F and the pixel positions of the captured images. The analyzing part 305 obtains correspondence between a pixel of the captured image and a pixel of the projection image by selecting a correspondence, which is closest to the correspondence obtained based on the binary stripe patterns, from among a plurality of correspondences obtained by analyzing gradation information of the gradation stripe patterns.

It should be noted that the analyzing part 305 may use the projection image including the gradation stripe patterns in place of using the projection image including the binary stripe patterns. The analyzing part 305 may be configured to obtain correspondence between a pixel of the captured image and a pixel of the projection image by sequentially projecting a plurality of projection images having the gradation stripe patterns with sinusoidal luminance distributions in which the stripe width is different from that of FIGS. 5A to 5D, in addition to the projection images having the gradation stripe patterns of FIGS. 5A to 5D. For example, the projection part 1 may be configured to project a plurality of projection images having the first periodic gradation stripe patterns, project a plurality of projection images having the second periodic gradation stripe patterns, and project a plurality of projection images having the third periodic gradation stripe patterns. In this case, the projection part 1 can identify the geometry of the object to be measured by projecting the projection image having the sinusoidal luminance distributions. Further, a plurality of projection images having the first to the third periodic gradation stripe patterns may be projected as the gradation stripe patterns extending in the first and the second directions.

Also, the defective pixel detected by the defective pixel detection part 304 does not exhibit a luminance that accords with the stripe patterns of the projection image due to the influence of multiple reflections. Therefore, the analyzing part 305 obtains correspondence between (i) the pixel of the captured image excluding the defective pixel detected by the defective pixel detection part 304 among the pixels of the captured image and (ii) the pixel of the projection image. In this way, the analyzing part 305 can lower the probability of erroneously obtaining the correspondence between the pixel of the captured image and the pixel of the projection image.

The geometry identification part 306 obtains the 3D geometry of the object to be measured based on the correspondence between the pixels of the captured image and the projection image obtained by the analyzing part 305. The arrangement of the projection part 1 and the capturing part 2 as well as the direction of the optical axes of the projection part 1 and the capturing part 2 are known. For this reason, using the principle of the triangulation method, the geometry identification part 306 obtains the 3D geometry of the object to be measured, for example, by obtaining the 3D position for each pixel of the captured image from the correspondence between the captured image and the projection image obtained by the analyzing part 305.

[Processing Procedure of the 3D Geometry Measurement Apparatus 100]

Figure 12:
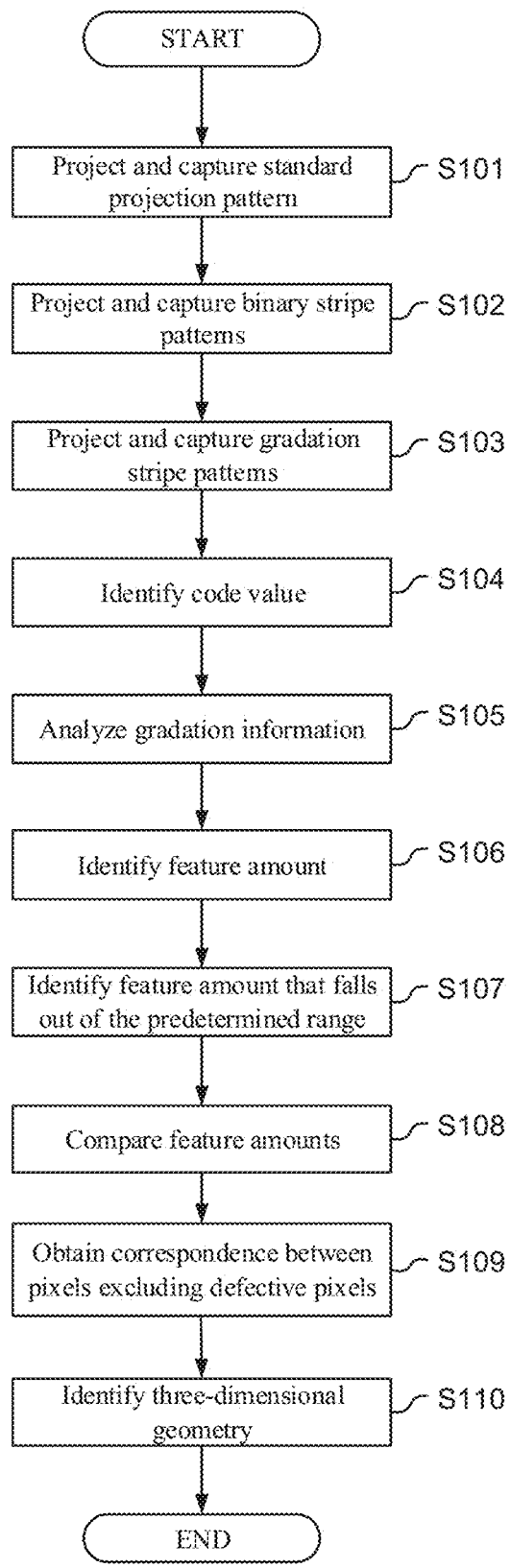
FIG. 12 is a flowchart showing an example of an operation of the 3D geometry measurement apparatus.

FIG. 12 is a flowchart showing an example of an operation of the 3D geometry measurement apparatus. The processing procedure starts when a user gives instructions to measure the object to be measured by the 3D geometry measurement apparatus 100 with an operation key, not shown, for example. First, the projection control part 301 projects the standard patterns by which light is not projected onto any part of the object to be measured (all-black pattern), and the capturing part 2 captures the object to be measured while the projection control part 301 projects the aforementioned standard pattern. Then, the projection control part 301 projects the standard projection pattern by which light is projected onto the entire object to be measured (all-white pattern), and the capturing part 2 captures the object to be measured while the projection part 1 projects the aforementioned standard pattern (S101).

Further, the projection control part 301 sequentially projects the plurality of projection images including the binary stripe patterns extending in the first direction, and the capturing part 2 captures the object to be measured while the projection control part 301 projects each projection image. Also, the projection control part 301 sequentially projects the plurality of projection images including the binary stripe patterns extending in the second direction, and the capturing part 2 captures the object to be measured while the projection control part 301 projects each projection image (S102).

Next, the projection control part 301 sequentially projects a plurality of projection images including the gradation stripe patterns that have sinusoidal luminance distributions and extend in the first direction, and the capturing part 2 captures the object to be measured while the projection part 1 projects each projection image. Also, the projection control part 301 sequentially projects a plurality of projection images including the gradation stripe patterns that have sinusoidal luminance distributions and extend in the second direction, and the capturing part 2 captures the object to be measured while the projection control part 301 projects each projection image (S103).

The analyzing part 305 identifies a code value of each pixel based on the luminance value of each pixel of the captured image in which the binary stripe patterns extending in the first and the second directions are projected (S104). Also, the analyzing part 305 analyzes gradation information of the captured image in which the gradation stripe patterns extending in the first and the second directions are projected (S105).

The feature amount identification part 303 identifies a feature amount indicating the feature of stripe patterns included both in (i) the captured image in which the gradation stripe patterns extending in the first and the second directions are projected and (ii) the captured image in which the binary stripe patterns extending in the first and the second directions are projected (S106).

Next, the defective pixel detection part 304 detects the defective pixels by identifying pixels in which the feature amount identified by the feature amount identification part 303 is out of the predetermined range (S107). First, the defective pixel detection part 304 detects, as the defective pixels, pixels of the first captured image whose first feature amount falls outside the predetermined range, the first feature amount being the feature amount identified by the feature amount identification part 303 on the basis of the stripe patterns extending in the first direction in the first captured image. Also, the defective pixel detection part 304 identifies pixels of the first captured image corresponding to pixels of the second captured image whose second feature amount falls outside the predetermined range, the second feature amount being the feature amount identified by the feature amount identification part 303 on the basis of the stripe patterns extending in the second direction in the second captured image. The defective pixel detection part 304 detects the identified pixels of the first captured image as the defective pixels.

The defective pixel detection part 304 compares the first feature amount and the second feature amount (S108) and detects the pixels whose difference between the first and the second feature amounts falls outside the predetermined range as the defective pixels.

The analyzing part 305 obtains correspondence between the pixels of the captured image defective pixel and the pixel of the projection image excluding the defective pixels by using the identified code values. Further, the analyzing part 305 obtains correspondence between the pixels of the captured image excluding the defective pixel and the pixels of the projection image by analyzing gradation information of the gradation stripe patterns (S109). The analyzing part 305 identifies correspondence between the pixels of the captured image and the projection image by selecting, from among a plurality of correspondences obtained by analyzing gradation information, the correspondence closest to the correspondence obtained using the code values. The geometry identification part 306 obtains the 3D geometry of the object to be measured based on the correspondence between the pixels of the captured image and the projection image obtained by the analyzing part 305 (S110).

According to the present embodiment, the defective pixel detection part 304 detects the defective pixels of the captured image affected by multiple reflections using the first feature amount of the first captured image which are identified from the captured image of the stripe patterns extending in the first direction and the second feature amount identified from the second captured image of the stripe patterns extending in the second direction. The second captured image is different from the first captured image in regards to the luminance distribution as well as in regards to the manner in which the multiply reflected light and the direct light overlap. Accordingly, it can be expected that the defective pixel detection part 304 detects the multiply reflected light in the second captured image even when the defective pixel detection part 304 fails to detect the multiply reflected light due to causes such as an overlap of the multiply reflected light and the direct light in the first captured image.

Also, the feature amount changes depending on the direction of projection pattern if multiple reflections occur on the target of measurement. However, the feature amount is not likely to significantly change even when the direction of the projection pattern is changed, if multiple reflections do not occur on the target of measurement. Accordingly, multiply reflected light can be more accurately detected by comparing the first feature amount and the second feature amount. Therefore, the defective pixel detection part 304 can improve the detection accuracy of defective pixel by detecting the defective pixel based on both the first and the second feature amounts.

Also, because the 3D geometry measurement apparatus 100 uses both (i) the first feature amount identified from the captured image of the stripe patterns extending in the first direction and (ii) the second feature amount identified from the captured image of the stripe patterns extending in the second direction, an administrator of the 3D geometry measurement apparatus 100 is freed from strictly setting the threshold value of individual feature amounts. For example, the administrator of the 3D geometry measurement apparatus 100 may set the range for the feature amount for not determining that a pixel is a defective pixel to be larger than the range in a case where just one of the first feature amount and the second feature amount is used. Also, the same effect can be achieved if the defective pixel detection part 304 uses a plurality of feature amounts. For this reason, while excluding the influence of multiple reflections, the geometry identification part 306 is capable of measuring a target with large subsurface scattering in which defective pixels are prone to being erroneously detected when a strict threshold value is set.

Also, according to the present embodiment, the defective pixel detection part 304 detects, as the defective pixels, the pixels included in the range from the defective pixel to the distance corresponding to one cycle of the stripes on both sides of that defective pixel. For this reason, the defective pixel detection part 304 can accurately remove the pixels affected by the multiply reflected light even when the distortion is not likely to occur in the synthetic light in which the direct light and multiply reflected light are combined due to the situation that the cycle of the direct light and the cycle of stripe patterns are close and the detection of defective pixels is difficult.

It should be noted that, in the present embodiment, the example of the case where the projection control part 301 sequentially projects the stripe patterns extending in the first and the second directions onto the object to be measured was explained. However, the present invention is not limited to the example of the case where the stripe patterns extending in the plural directions are constantly projected onto the object to be measured. For example, the projection control part 301 may be configured to project the stripe patterns extending in the first direction onto the object to be measured and project the stripe patterns extending in the second direction when the amount of defective pixels detected based on the first feature amount by the defective pixel detection part 304 is outside the standard range. This standard range can be statistically obtained, for example, with a range of defective pixels and the desired measurement accuracy. Also, the standard range may be obtained using, for example, a ratio of the range of pixels not corresponding to the defective pixel and the range of defective pixels.

Also, in the present embodiment, the example of the case where the projection control part 301 projects the projection image including the stripe patterns extending in the first direction and the projection image including the stripe patterns extending in the second direction onto the object to be measured was explained. However, the present invention is not limited to the example of the case where the stripe patterns extending in the first and the second directions are projected. For example, the projection control part 301 may be configured to project a projection image including the stripe patterns extending in neither the first direction nor the second direction onto the object to be measured when the amount of defective pixels detected by the defective pixel detection part 304 is outside the predetermined range. This predetermined range can be statistically obtained, for example, with the range of defective pixels and the desired measurement accuracy. Also, the predetermined range may be obtained using, for example, a ratio of the range of pixel not corresponding to the defective pixel and the range of defective pixel. On the other hand, the projection control part 301 does not project a projection image including the stripe patterns extending in the different directions on to the object to be measured when the amount of the defective pixel detected by the defective pixel detection part 304 is within the predetermined range. By adopting this configuration, the defective pixel detection part 304 can improve accuracy of detecting defective pixels.

Also, the projection control part 301 may be configured to repeat the processing for projecting the projection image including the stripe patterns extending in another direction on to the object to be measured. For example, the projection control part 301 sequentially projects the stripe patterns extending in the first direction to the Nth direction (N being a natural number). The projection control part 301 may be configured to stop projecting the stripe patterns based on the range of a defective pixel newly detected from the captured image to which the stripe patterns extending in the Nth direction is projected. That is, the projection control part 301 may be configured to stop projecting the stripe patterns when the range of defective pixels not detected from the captured image captured when the stripe patterns extending in the first direction to the Nth direction are projected, among the defective pixels detected in the captured image captured when the stripe patterns extending in the Nth direction are projected, is equal to or smaller than a threshold value. The threshold value is, for example, a value indicating that the influence of multiply reflected light has become sufficiently small.

Also, the projection control part 301 may project the projection image including the stripe patterns extending in the first direction onto the object to be measured, and then additionally project the projection image with the stripe patterns extending in the first direction and having different cycles onto the object to be measured. Further, the projection control part 301 may project the projection image including the stripe patterns extending in the second direction onto the object to be measured, and then additionally project the projection image with the stripe patterns extending in the second direction and having the different cycles onto the object to be measured. When the stripe patterns with the different cycles are projected, the phase of multiply reflected light overlapping the direct light changes. For this reason, the defective pixel detection part 304 can detect the pixel affected by the multiply reflected light more accurately.

It is preferable that the defective pixel detection part 304 compare the feature amounts using the stripe patterns having the same cycle. As mentioned above, the same applies to the case where the plurality of gradation stripe patterns having different cycles are used but not the binary patterns when obtaining correspondence of the pixels of the captures image and the projection image.

Also, in the present embodiment, the example of the case where the projection control part 301 projects each projection image using projection light having the same wavelength was explained. However, the present invention is not limited to this case. For example, the projection control part 301 may project more than two projection images including the stripe patterns extending in the first direction onto the object to be measured using light of a first wavelength and may project the projection image including the stripe patterns extending in the second direction onto the object to be measured using light of a second wavelength. By adopting this configuration, projecting the stripe patterns extending in the first direction and the stripe patterns extending in the second direction onto the object to be measured is enabled, and the amount of measurement time can be reduced. The threshold value may be changed with respect to each wavelength.

Also, in the present embodiment, the example of the case where the projection control part 301 projects the projection image including the stripe patterns extending in the second direction with regard to both the gradation stripe patterns having the sinusoidal luminance distributions and the binary stripe pattern onto the object to be measured was explained. However, this invention is not limited to this. For example, the projection control part 301 may take the configuration where the gradation stripe patterns extending in the second direction are projected onto the object to be measured, but the binary stripe patterns extending in the second direction does not need be projected onto the object to be measured. By this, the projection control part 301 can reduce the amount of measurement time.

Also, the projection control part 301 does not need to project the same number of projection images of the gradation stripe patterns or the binary stripe patterns to be projected in the first and the second directions. For example, the projection control part 301 may make the number of projection images of the gradation stripe patterns in the second direction smaller than that of the first direction (for example: for the first direction, 6 phase shifts every 60 degrees; for the second direction, 4 phase shifts every 90 degrees; and the like).

Also, in the present embodiment, the example of the case where the analyzing part 305 obtains correspondence of the pixels of the projection image and the captured image by respectively analyzing the captured images of the object to be measured while the gradation stripe patterns and the binary stripe patterns are projected was explained. However, the present invention is not limited to this case. For example, it may take the configuration such that the analyzing part 305 obtains correspondence of the pixels of the projection image and the captured image by analyzing the captured image of the object to be measured while the binary stripe patterns is projected, and the projection control part 301 does not project the gradation stripe patterns. In this case, the feature amount identification part 303 may obtain the feature amount such as the offset $O_f$ from the captured image onto which the binary stripe patterns are projected.

Also, in the present embodiment, the example of the case where the projection control part 301 projects the projection image including the stripe patterns extending in the first direction and the projection image including the stripe patterns extending in the second direction onto the object to be measured is described, where the first direction and the second direction are orthogonal to one another. However, the present invention is not limited to this case. For example, the first direction and the second direction may be approximately orthogonal to one another. The first direction may be angled at any degree excluding the degree shown in FIG. 2B. The second direction may be angled at any degree different from that of the first direction.

Also, in the present embodiment, the example of the case where the defective pixel detection part 304 defects a pixel as the defective pixel when the difference between the first and the second feature amounts falls outside the predetermined range was explained. However, the present invention is not limited to this case. For example, the defective pixel detection part 304 may detect a pixel whose ratio between the first and the second feature amounts falls outside the predetermined range as the defective pixel.

The characteristics of the 3D geometry measurement apparatus and the 3D geometry measurement method according to the first embodiment will be summarized.

The 3D geometry measurement apparatus including:

(1) a projection part that sequentially projects two or more projection images including stripe patterns extending in a first direction, and projects at least one projection image including stripe patterns extending in a second direction onto the object to be measured;
a capturing part that respectively generates captured images including the stripe patterns projected onto the object to be measured by the projection part;
a feature amount identification part that identifies the feature amount indicating the stripe patterns included in the captured image;
the defective pixel detection part that detects the defective pixels in the captured image affected by the multiple reflections based on (i) the first feature amount identified from the captured image of the stripe patterns extending in the first direction and (ii) the second feature amount identified from the captured image of the stripe patterns extending in the second direction, both of which are identified by the feature amount identification part;
an analyzing part that obtains correspondence between (i) the pixels of the captured image defective pixel and (ii) the pixels of the projection image excluding the defective pixels; and
a geometry identification part that identifies the 3D geometry of the object to be measured based on the correspondence obtained by the analyzing part.

(2) The 3D geometry measurement apparatus according to (1), wherein the defective pixel detection part detects the pixels in the captured image whose first feature amount or second feature amount falls outside the predetermined range as the defective pixels.

(3) The 3D geometry measurement apparatus according to (1) or (2), wherein the defective pixel detection part detects the pixels in the captured image whose difference between the first feature amount and the second feature amount is equal to or more than the threshold value as the defective pixels.

(4) The 3D geometry measurement apparatus according to any one of (1) to (3), wherein the defective pixel detection part detects the pixels in the captured image whose first feature amount falls outside the first range as the defective pixels and detects the pixels in the captured image whose second feature amount falls outside the second range as the defective pixels.

(5) The 3D geometry measurement apparatus according to any one of (1) to (4), wherein the projection part sequentially projects the binary image and the image having the sinusoidal luminance distributions as the above-mentioned two or more projection images including the stripe patterns extending in the first direction.

(6) The 3D geometry measurement apparatus according to any one of (1) to (5), wherein the first direction is the direction orthogonal to the plane including the optical axes of the projection part and the capturing part, and the second direction is the direction parallel to the plane including the optical axes of the projection part and the capturing part.

(7) The 3D geometry measurement apparatus according to any one of (1) to (6), wherein the defective pixel detection part detects the pixels included in the range from the defective pixel to the distance corresponding to one cycle of the stripes on both sides of the detected defective pixel as the defective pixels.

(8) The 3D geometry measurement apparatus according to any one of (1) to (7), wherein the projection part projects the above-mentioned two or more projection images including the stripe patterns extending in the first direction onto the object to be measured using the light of the first wavelength and projects projection image including the stripe patterns extending in the second direction onto the object to be measured using the light of the second wavelength.

(9) The 3D geometry measurement apparatus according to any one of (1) to (8), wherein the projection part projects the projection image including the stripe patterns extending in neither the first direction nor the second direction onto the object to be measured when a range of the defective pixel detected by the defective pixel detection part is outside the predetermined range.

(10) The 3D geometry measurement apparatus according to any one of (1) to (9), wherein the projection part projects the projection image including the stripe patterns extending in the second direction onto the object to be measured when the range of the defective pixel detected based on the first feature amount by the defective pixel detection part is more than the standard range.

(11) The 3D geometry measurement apparatus according to any one of (1) to (10), wherein the projection part sequentially projects the projection image including the stripe patterns having the sinusoidal luminance distributions with different widths as the projection image including the stripe patterns extending in the first and the second directions.

(12) The 3D geometry measurement method including:
a projecting step that sequentially projects two or more projection images including the stripe patterns extending in the first direction and projects the projection image including the stripe patterns extending in the second direction onto the object to be measured;
a capturing step that respectively generates the captured images including the stripe patterns projected onto the object to be measured in the projecting step;
a feature amount identifying step that identifies the feature amount indicating the stripe patterns included in the captured image;
a defective pixel detecting step that detects defective pixels in the captured image affected by multiple reflections based on the first feature amount identified from the captured image of the stripe patterns extending in the first direction and the second feature amount identified from the captured image of the stripe patterns extending in the second direction, both of which are identified in the feature amount identifying step;
an analyzing step that obtains correspondence between (i) the pixels of the captured image defective pixel and (ii) the pixels of the projection image excluding the defective pixels; and
a geometry identifying step that identifies the 3D geometry of the object to be measured based on the correspondence obtained in the analyzing step.

Second Embodiment

In the first embodiment, the example of the case where the defective pixel detection part 304 detects the defective pixels by determining whether the feature amount identified by the feature amount identification part 303 is within the predetermined range was explained. However, the present invention is not limited to this case. In the second embodiment, on the other hand, an example of the case where defective pixels are detected based on the positional relationship between pixels and epipolar lines will be explained.

[Principle of the Defective Pixel Detection]

Figure 13:
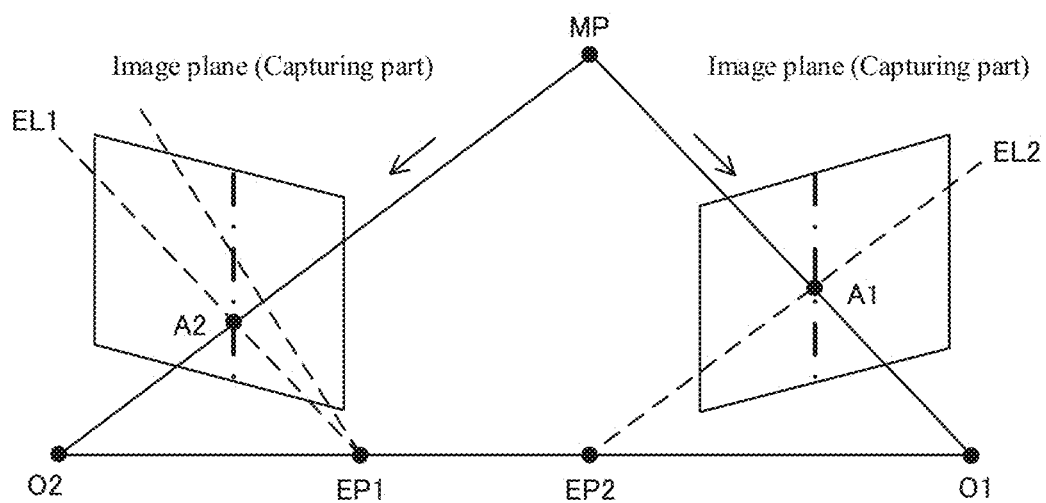
FIG. 13 illustrates the principle of detecting a defective pixel according to the second embodiment.
Figure 14:
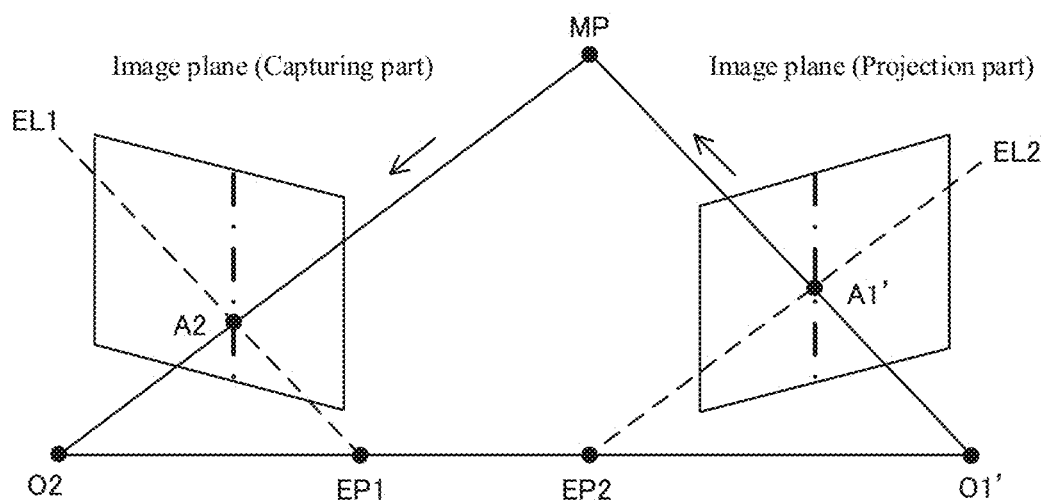
FIG. 14 illustrates the principle of detecting the defective pixel according to the second embodiment.

FIGS. 13 and 14 illustrate the principle of detecting the defective pixel according to the second embodiment. FIG. 13 indicates an example of the case where a measurement point MP on the object to be measured is captured by a pair of capturing parts. A pixel position on a captured image plane of the capturing part on the right side of FIG. 13 corresponding to the measurement point MP is a captured pixel position A1, and a pixel position on a captured image plane of the capturing part on the left side of FIG. 13 corresponding to the same measurement position MP is a captured pixel position A2. In this case, the captured pixel positions A1 and A2 have a fixed relationship based on the positional relationship between the two capturing parts. A straight line projected on the captured image plane of the capturing part on the left side is the first epipolar line EL1, the straight line being a straight line extending from an optical center O1 of the capturing part on the right side to the measurement point MP through the captured pixel position A1. The first epipolar line EL1 is indicated by a broken line in the oblique direction. The captured pixel position A2 is, due to the nature of geometrical restriction, at any position on the first epipolar line EL1 being projected on the captured image.

Also, a straight line projected on the captured image plane of the capturing part on the right side is the second epipolar line EL2, the straight line being a straight line extending from an optical center O2 of the capturing part 2 on the left side to the measurement point MP through the captured pixel position A2. The captured pixel position A1, due to the nature of a geometrical restriction, is at any position on the second epipolar line EL2.

On the captured image plane on the left side, a plurality of the first epipolar lines can be drawn. Each of the first epipolar lines intersects with another at one point, the epipole EP1. Similarly, on the captured image plane on the right side, a plurality of the second epipolar lines can be drawn. Each of the second epipolar lines intersects with another at one point, the epipole EP2.

FIG. 14 illustrates an example of the case where the projection part 1 projects the projection image including the stripe patterns onto the object to be measured and the capturing part 2 captures the projection image onto the object to be measured. In the case of FIG. 14, when the projection part 1 is regarded as the capturing part by assuming that the orientation of the light beam is in the opposite orientation, the projection pixel position A1' which is the position of the pixel of the projection image and the captured pixel position A2 are in the same corresponding relationship as in FIG. 13. When an optical center of the projection part 1 is O1', a straight line projected on the captured image plane of the capturing part 2 is the first epipolar line EL1, the straight line being a straight line extending from the optical center O1' of the projection part 1 to the measurement point MP through the projection pixel position A1'.

The captured pixel position A2 is at any position on the first epipolar line EL1. On the other hand, if the captured pixel position A2 is not on the first epipolar line EL1, multiple reflections may be occurring on an optical path or the like between the projection pixel position A1' and the captured pixel position A2. Using this principle, a defective pixel detection part 502 detects the defective pixels by comparing the captured pixel position A2 and the position of the first epipolar line EL1.

Also, when an optical center of the capturing part 2 is O2, a straight line projected on the projection image plane of the projection part 1 is the second epipolar line EL2, the straight line being a straight line extending from the optical center O2 of the capturing part 2 to the measurement point MP through the captured pixel position A2. The projection pixel position A1' is at any position on the second epipolar line EL2. On the other hand, if the projection pixel position A1' is not on the second epipolar line EL2, there is a possibility that the pixel of the projection pixel position A1' is a defective pixel. Using this principle, the defective pixel detection part 502 may detect the defective pixel by comparing the projection pixel position A1' and the position of the second epipolar line EL2.

[Configuration of a 3D Geometry Measurement Apparatus 200 According to the Second Embodiment]

Figure 15:
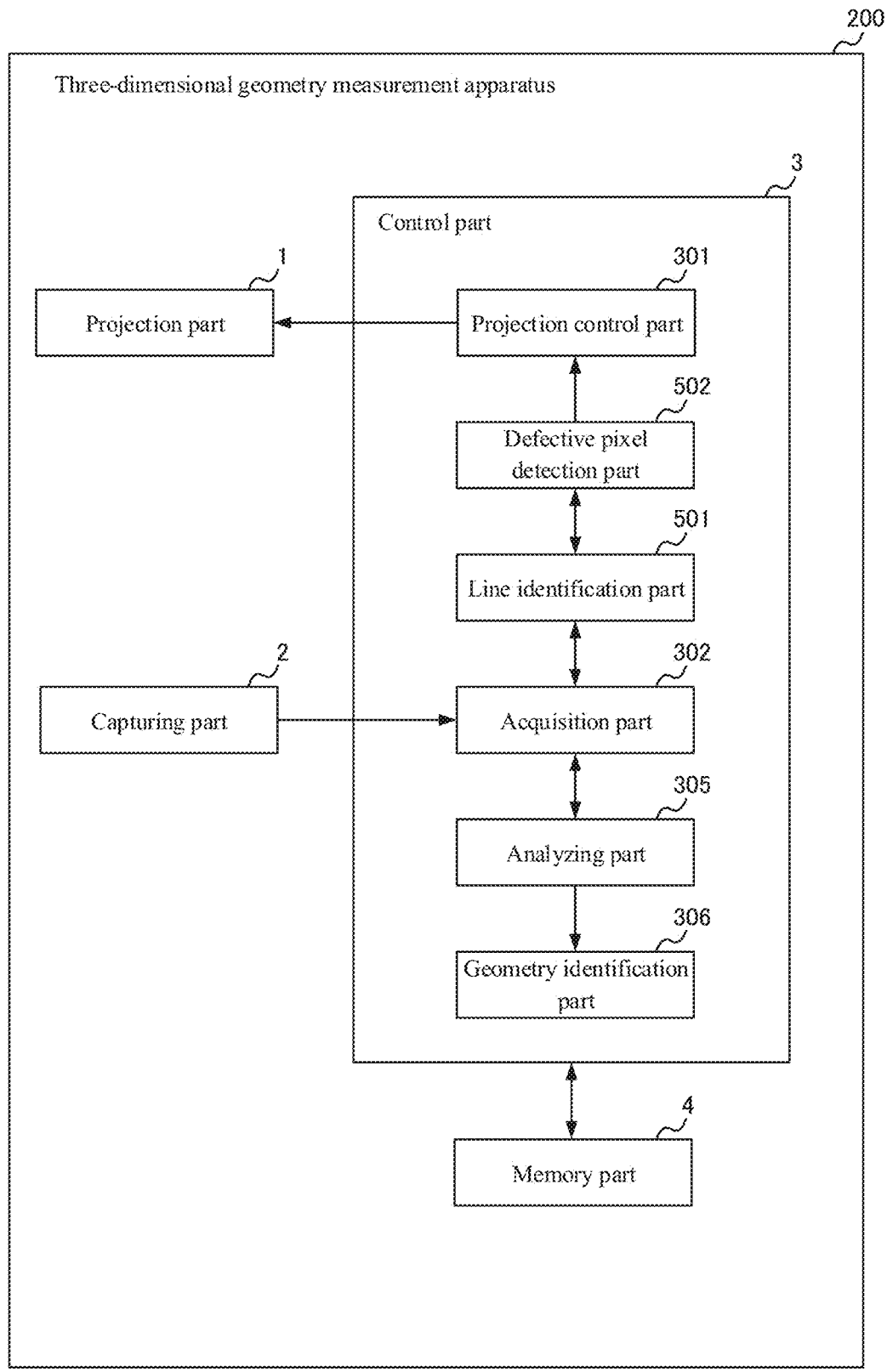
FIG. 15 shows a configuration of the 3D geometry measurement apparatus.

FIG. 15 illustrates a configuration of the 3D geometry measurement apparatus 200 according to the second embodiment. The 3D geometry measurement apparatus 200 includes the projection part 1, the capturing part 2, the control part 3, and the memory part 4. The control part 3 is, for example, the CPU and functions as the projection control part 301, the acquisition part 302, a line identification part 501, the defective pixel detection part 502, the analyzing part 305, and the geometry identification part 306 by executing the programs stored in the memory part 4. Regarding the functional blocks that are the same as those shown in FIG. 3, the same reference numerals are used and the associated description is omitted.

The projection control part 301 includes the same function as that of the projection control part 301 of FIG. 3. The projection control part 301 controls a circuit for switching ON/OFF of the projection part 1 for each pixel, and thus the projection control part 301 is capable of projecting only a part of the pixels of the projection part 1. Because there are many defective pixels caused by the multiply reflected light, the influence of multiply reflected light can be prevented if a projection image in which projection image pixels of the positions corresponding to the defective pixels are removed is projected defective pixel. Therefore, when the defective pixel detection part 502 detects defective pixels, the projection control part 301 projects a projection image generated by removing the defective pixels detected by the defective pixel detection part 502 from the pixels of the original projection image (hereinafter referred to as the first selected projection image) onto the object to be measured.

It can be considered that a defective pixel due to multiple reflections occurs by projecting the projection images including a number of pixels onto the object to be measured at one time. Therefore, when the defective pixel detection part 502 detects the defective pixels, the projection control part 301 projects an image including the defective pixels detected by the defective pixel detection part 502 (hereinafter referred to as the second selected projection image) onto the object to be measured and performs the measurement again in order to reduce the number of pixels to be projected at one time. The second selected projection image is, for example, the projection image composed of the defective pixels detected by the defective pixel detection part 502.

The line identification part 501 identifies the first epipolar line of the capturing part 2 corresponding to the projection pixel image or the second epipolar line of the projection part 1 corresponding to the captured pixel position. The position of the first epipolar line of the capturing part 2 with respect to any one of the projection pixel positions of the projection part 1 is predetermined. The relationship between the projection pixel position and the first epipolar line is uniquely determined on the basis of the relationship between the projection part 1 and the capturing part 2, and is not influenced by the position or the size of the object to be measured. Similarly, the position of the second epipolar line of the projection part 1 is predetermined with respect to any one of the captured pixel positions of the capturing part 2. The memory part 4 pre-stores the position of the first epipolar line of the capturing part 2 with respect to each projection pixel position and the position of the second epipolar line of the projection part 1 with respect to each captured pixel position of the capturing part 2.

The line identification part 501 identifies the positions of the first epipolar line with respect to the projection pixel position and the second epipolar line with respect to the captured pixel position by reading the positions of the epipolar lines stored in the memory part 4. The line identification part 501 sends information related to the position of the identified first epipolar line or second epipolar line to the defective pixel detection part 502.

The analyzing part 305 has a similar function as in the first embodiment. The analyzing part 305 obtains correspondence of the projection pixel position, which is the position of the projection pixel, and the captured pixel position, which is the position of the captured pixel acquired by the acquisition part 302.

The analyzing part 305 obtains an absolute phase value of each captured pixel position by analyzing gradation of patterns in the first direction and the second direction having sinusoidal luminance distributions in the captured image. The absolute phase value $I_{AP,k}(I, j)$ is represented by the expression below, where i and j respectively show the i-th pixel from the left edge in the second direction and the j-th pixel from the top edge in the first direction.

$$I_{AP,k}(i,j) = (2\pi m_i + \varphi_i, 2\pi m_j + \varphi_j)$$

In the above expression, $\varphi_i$ and $\varphi_j$ are phase values of stripes in stripe patterns. Furthermore, $m_i$ and $m_j$ respectively show the number of stripes from the left edge and the top edge. The projection pixel position $(i_p, j_p)$ corresponding to the captured pixel position $(i, j)$ can be obtained by the expression below. It should be noted that $p_k$ is the number of pixels of the projection part 1 corresponding to one cycle of stripes in the stripe pattern.

$$(i_p, j_p) = \left( \frac{p_1 I_{AP,1}}{2\pi}, \frac{p_2 I_{AP,2}}{2\pi} \right)$$

The analyzing part 305, for example in a re-measurement, estimates correspondence between the projection pixel position of the first selected projection image and the captured pixel of the captured image of the object to be measured onto which the first selected projection image is projected, in a case when the projection control part 301 projects the first selected projection image that does not include defective pixels. Since the defective pixels may be influenced by multiply reflected light, the projection control part 301 prevents the influence of the multiply reflected light by projecting the first selected projection image that does not include defective pixels. Therefore, the analyzing part 305 can accurately obtain the correspondence between the projection pixel position and the captured pixel position.

The analyzing part 305 estimates correspondence between the projection pixel position of the second selected projection image and the captured pixel position of the captured image when the projection control part 301 projects the second selected projection image that includes defective pixels, for example, during the re-measurement. The projection control part 301 decreases the number of pixels that are simultaneously projected by projecting the second selected projection image, compared to the case when all projection images are projected. The analyzing part 305 can increase the number of pixels that are used for identifying the 3D geometry of the object to be measured by estimating the correspondence of the pixels that the defective pixel detection part 502 detected as defective pixels again.

The defective pixel detection part 502 detects defective pixels on the basis of the relationship between the captured pixel position and the first epipolar line or the relationship between the projection pixel position and the second epipolar line. The defective pixel detection part 502 detects the pixels corresponding to the captured pixel position or the projection pixel position as defective pixels if the distance between the captured pixel position and the first epipolar line corresponding to a projection pixel position having correspondence with the captured pixel position is larger than or equal to the first threshold value or if the distance between the projection pixel position and the second epipolar line corresponding to a captured pixel position having correspondence with the projection pixel position is larger than or equal to the second threshold value.

Figure 16:
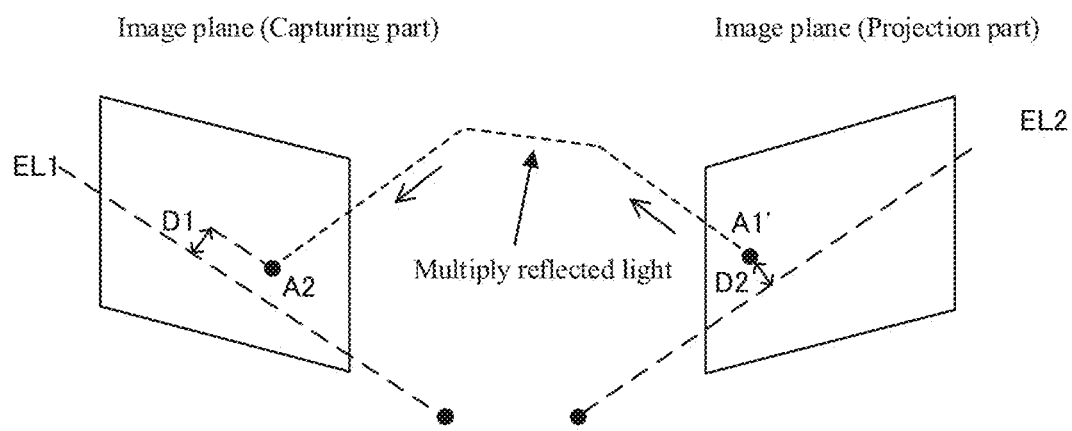
FIG. 16 illustrates a detecting operation of a defective pixel by a defective pixel detecting part.

FIG. 16 shows an operation of detecting defective pixels performed by the defective pixel detection part 502. FIG. 16 shows a situation when projected light from the projection part 1 is multiply reflected. The multiply reflected light is shown with a dashed line. The projected light from projection pixel position A1' on the image plane of the projection part 1 reaches captured pixel position A2 on the image plane of the capturing part 2 as multiply reflected light that has been reflected a plurality of times on the object to be measured.

As was shown in FIG. 14, the captured image position A2 is on the first epipolar line EL1 corresponding to the projection pixel position A1' if the projected light reaches the capturing part 2 after reflecting only once on the object to be measured. On the other hand, as shown in FIG. 16, the captured image position A2 does not match the first epipolar line EL1 corresponding to the projection pixel position A1' if the projected light reaches the capturing part 2 after being multiply reflected on the object to be measured. In these cases, the defective pixel detection part 502 determines that the pixel at the captured pixel position A2 is a defective pixel.

[Defect Determination by the Capturing Part 2]

The defective pixel detection part 502 obtains a position of the first epipolar line EL1 that the line identification part 501 identified as the first epipolar line of the capturing part 2 corresponding to the projection pixel position A1'. The defective pixel detection part 502 determines whether or not the projected light that reached the captured pixel position A2 is multiply reflected light by comparing the captured pixel position A2 and the position of the first epipolar line EL1. More specifically, the defective pixel detection part 502 obtains a distance D1 between the captured pixel position A2 and the first epipolar line EL1 and compares the obtained distance D to the first threshold value. The first threshold value is a value that shows the distance between the captured pixel position A2 where the projected light can reach after being reflected only once on the object to be measured.

The defective pixel detection part 502 detects pixels at the captured pixel position A2 as defective pixels if the distance between the captured pixel position A2 and the first epipolar line EL1 is larger than or equal to the first threshold value. Further, the defective pixel detection part 502 detects pixels at the projection pixel position A1' as defective pixels. The projection pixel position A1' is the position that the analyzing part 305 estimated to have correspondence with the capture pixel position A2 at which the defective pixels are detected. The defective pixel detection part 502 sends information related to the positions of the detected pixels to the analyzing part 305 and the geometry identification part 306. On the other hand, the defective pixel detection part 502 does not detect pixels at the captured pixel position A2 and the projection pixel position A1' as defective pixels if the distance between the captured pixel position A2 and the first epipolar line EL1 is less than or equal to the first threshold value. In this case, the defective pixel detection part 502 sends information related to the distance D1 between the captured pixel position A2 and the first epipolar line EL1 to the geometry identification part 306.

[Defect Determination of by the Projection Part 1]

Further, the defective pixel detection part 502 obtains the position of the second epipolar line EL2 that the line identification part 501 identified as the second epipolar line of the projection part 1 corresponding to the captured pixel position A2. The defective pixel detection part 502 determines whether or not the projected light from the projection pixel position A1' is multiply reflected light by comparing the projection pixel position A1' and the position of the second epipolar line EL2. More specifically, the defective pixel detection part 502 obtains a distance D2 between the projection pixel position A1' and the second epipolar line EL2 and compares the obtained distance D2 to the second threshold value. The second threshold value is a value that shows the distance between the projection pixel position A1' having correspondence to the captured pixel position A2 and the second epipolar line EL2 corresponding to the captured pixel position A2 when the projected light is a direct light that is reflected only once on the object to be measured.

The defective pixel detection part 502 detects pixels at the projection pixel position A1' as defective pixels if the distance between the projection pixel position A1' and the second epipolar line EL2 is larger than or equal to the second threshold value. Further, the defective pixel detection part 502 detects pixels at the capture pixel position A2 as defective pixels. The capture pixel position A2 is the position that the analyzing part 305 estimated to have correspondence with the projection pixel position A1' at which a defective pixel is detected. The defective pixel detection part 502 sends information related to the positions of the detected defective pixels to the analyzing part 305 and the geometry identification part 306. On the other hand, the defective pixel detection part 502 does not detect pixels at the projection pixel position A1' and the captured pixel position A2 as defective pixels if the distance between the projection pixel position A1' and the second epipolar line EL2 is less than or equal to the second threshold value. In this case, the defective pixel detection part 502 sends information related to the distance D2 between the projection pixel position A1' and the second epipolar line EL2 to the geometry identification part 306.

[Position of an Epipole]

Figure 17:
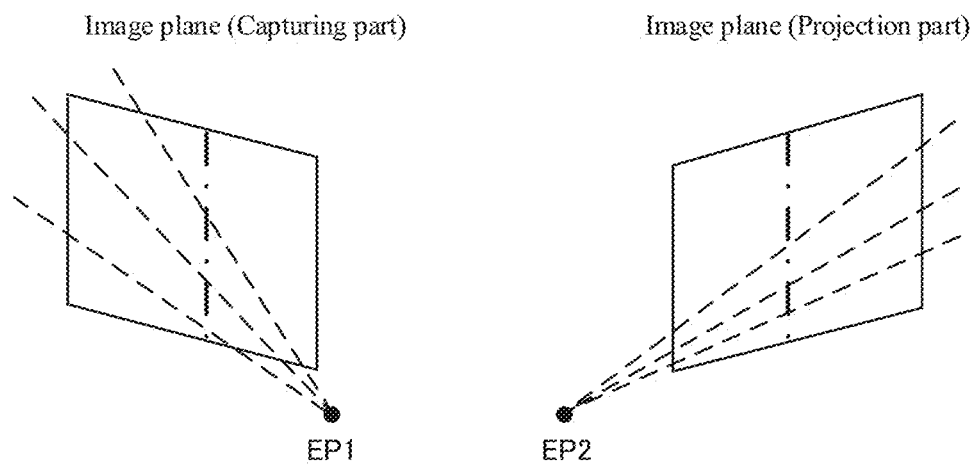
FIG. 17 illustrates epipoles.

It is preferable that the capturing part 2 and the projection part 1 are arranged so that the plurality of the first epipolar lines of the capturing part 2 identified by the line identification part 501 do not cross each other in the captured image. Also, it is preferable that the capturing part 2 and the projection part 1 are arranged so that the plurality of the second epipolar lines of the projection part 1 identified by the line identification part 501 do not cross each other in the captured image. FIG. 17 is a drawing for explaining epipoles. Each of the first epipolar lines on the captured image plane identified by the line identification part 501 passes the epipole EP1. Also, each of the second epipolar lines on the projection image plane identified by the line identification part 501 passes the epipole EP2.

The defective pixel detection part 502 detects the defective pixels by comparing the distance between the captured pixel position and the first epipolar line of the captured image to the first threshold value. Also, the defective pixel detection part 502 detects the defective pixels by comparing the distance between the projection pixel position and the second epipolar line of the projection image to the second threshold value. However, if a defective pixel is at a position near either the epipole EP1 or the epipole EP2, this defective pixel is considered to be close to both epipolar lines. Accordingly, there is a possibility that the defective pixel detection part 502 cannot detect defective pixels at the positions near the epipole EP1 or the epipole EP2. Therefore, it is preferable that the capturing part 2 and the projection part 1 are arranged in a manner that each of the epipoles EP1 and EP2 is located outside the captured image and the projection image so that a situation that the defective pixel being near an epipolar line hardly occurs.

[Detection of Overlapping Correspondence]

Figure 18:
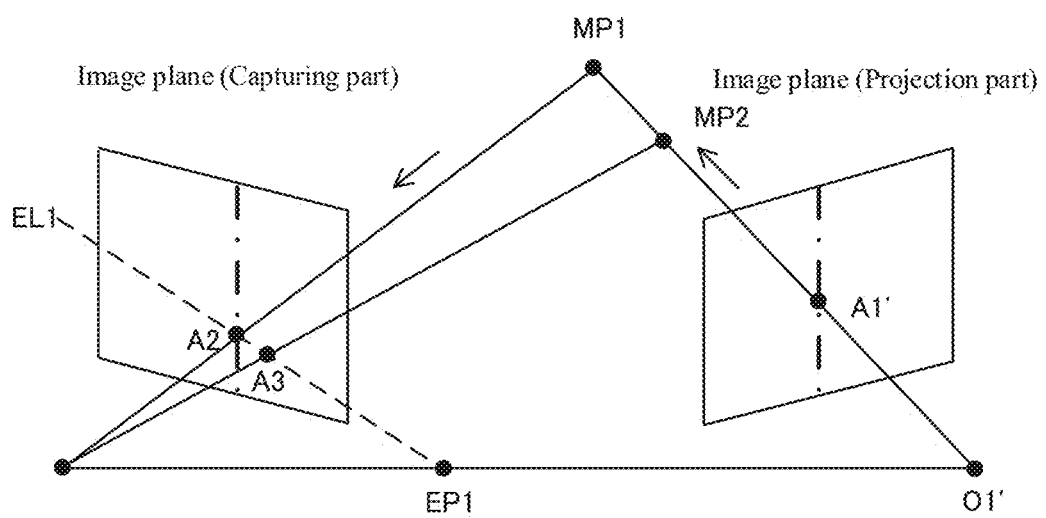
FIG. 18 illustrates detecting of the defective pixel on epipolar lines by the defective pixel detecting part.

When the analyzing part 305 estimates that one projection pixel position of projection images correspond to a plurality of captured pixel locations on the first epipolar line of the capturing part 2 identified by the line identification part 501, the defective pixel detection part 502 detects at least one of the pixels corresponding to the same projection pixel position as a defective pixel. FIG. 18 is a drawing for explaining a detection of defective pixels on an epipolar line.

As FIG. 18 shows, if the analyzing part 305 estimates that the plurality of the captured pixel positions A2 and A3 on the first epipolar line correspond to the same projection pixel position A1' of different projection images, there is a high possibility that multiple reflections occurred because projected lights from the same projection pixel position A1' of different projection images each reflect at different measurement points MP1 and MP2. Therefore, the defective pixel detection part 502 determines whether or not the analyzing part 305 estimated that the plurality of the captured pixel positions A2 and A3 on the first epipolar line EP1 correspond to the same projection pixel position A1' of different projection images. The defective pixel detection part 502 detects the pixels of the captured pixel positions A2 and A3 as defective pixels when the analyzing part 305 has estimated that the plurality of the captured pixel positions A2 and A3 on the first epipolar line EL1 correspond to the same projection pixel position A1' of different projection images.

Similarly, the defective pixel detection part 502 may determine whether or not the analyzing part 305 estimated that the plurality of projection pixel positions on the second epipolar line of the projection image correspond to the same captured pixel positions of different captured images. If the analyzing part 305 estimated that the plurality of projection pixel positions on the second epipolar line of the projection part 1 identified by the line identification part 501 correspond to the same captured pixel positions of different captured images, the defective pixel detection part 502 detects pixels at the captured pixel position and at the projection pixel position having correspondence to the captured pixel position as defective pixels.

As describe above, the defective pixel detection part 502 detects defective pixels on the basis of a distance between the captured pixel position corresponding to the projection pixel position and the first epipolar line of the captured image corresponding to the projection pixel position. Accordingly, there is a possibility that the defective pixel detection part 502 cannot detect a defective pixel if a defective pixel is on an epipolar line. Therefore, the defective pixel detection part 502 detects whether or not the analyzing part 305 estimated that the plurality of captured pixel positions on an epipolar line correspond to the same projection pixel position of projection images in order to prevent a failure of detecting the defective pixels.

It should be noted that there is a possibility that multiple reflections occurred when the analyzing part 305 estimated that a plurality of captured pixel positions that are not on the same epipolar lines correspond to the same projection pixel position of projection images. Accordingly, the defective pixel detection part 502 may detect at least any one of the pixels at the plurality of captured pixel positions corresponding to the same projection pixel position as a defective pixel when the analyzing part 305 has estimated that the same projection pixel location of projection images corresponds to a plurality of captured pixel positions. The defective pixel detection part 502 may detect all of the pixels at the plurality of captured pixel positions corresponding to the same projection pixel position as defective pixels, and may detect some of the pixels at these captured pixel positions as defective pixels.

[Detection of Defective Pixels Using a Horizontal Pattern]

Figure 19A:
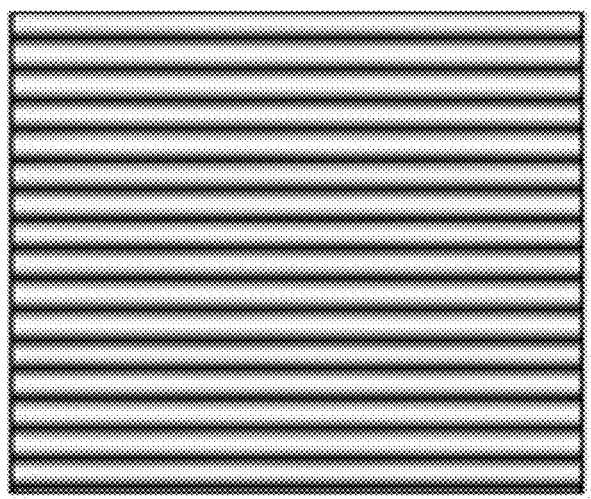
FIGS. 19A and 19B each illustrate a detecting method of the defective pixel by the defective pixel detecting part in a case of projecting stripe patterns extending in the second direction.
Figure 19B:
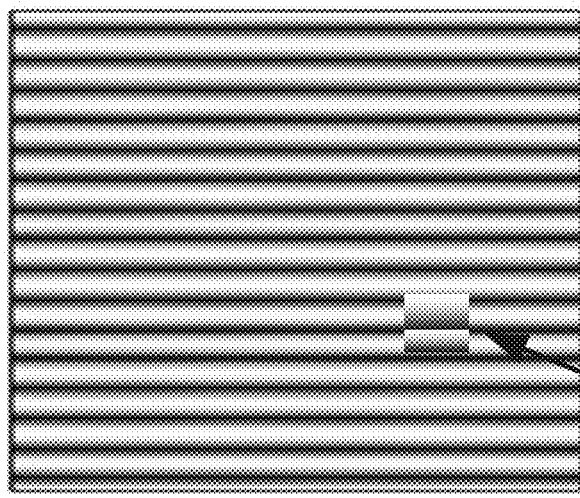

It is preferable that the defective pixel detection part 304 detects defective pixels by using the vertical pattern shown in FIG. 2A and the horizontal pattern shown in FIG. 2B. For example, if the defective pixel detection part 304 did not detect a defective pixel when the defective pixel detection part 304 performed measurement using a vertical pattern extending in the first direction on a captured image of an object to be measured onto which a projection image was projected, the defective pixel detection part 304 performs measurement using the stripe pattern extending in the second direction that is orthogonal to the first direction on a captured image of an object to be measured onto which a projection image is projected. When the phase of the stripe pattern extending in the second direction or the amount of phase change between pixels differs beyond a standard value compared to the case of projecting the same projection image on an object to be measured such as a plane where multiple reflections do not occur, the defective pixel detection part 304 detects the pixels whose phase or the amount of phase change differs as defective pixels. FIGS. 19A and 19B each are a drawing for explaining a method for detecting defective pixels by the defective pixel detection part 304 when a stripe pattern extending in the second direction is projected.

FIG. 19A shows a captured image when the projection control part 301 projects a stripe pattern extending in the second direction (horizontal pattern) onto an object to be measured such as a plane where multiple reflections do not occur. FIG. 19B shows a captured image when the projection control part 301 projects the same stripe pattern as FIG. 19A when another object to be measured is placed at a position where measurement is performed. The stripe patterns shown in FIG. 19A and FIG. 19B have sinusoidal luminance distributions. In FIG. 19B, the phase of the luminance distribution in part of the regions shown by an arrow has been changed from the status of FIG. 19A.

If the projection control part 301 projects a projection image including a stripe pattern extending in the second direction, the phase does not tend to change due to the object to be measured, compared to a stripe pattern extending in the first direction, because a direction that the phase of a stripe pattern changes due to the presence of the object to be measured matches the direction of the optical axis of the capturing part 2. Accordingly, if a phase of the pixels in the captured image changes when the projection control part 301 projects a projection image including a stripe pattern extending in the second direction, the possibility that the change is caused by multiply reflected light is high. Therefore, the defective pixel detection part 304 can improve accuracy by detecting a pixel whose phase changed beyond a standard value as a defective pixel from among pixels in a captured image when the projection control part 301 projected a stripe pattern extending in the second direction. The standard value is a value that shows the amount of change of phase that can occur due to an influence of the 3D geometry of the object to be measured, external light, or the like.

[Modification of Correspondence Between the Captured Pixel Position and the Projection Pixel Position]

Figure 20:
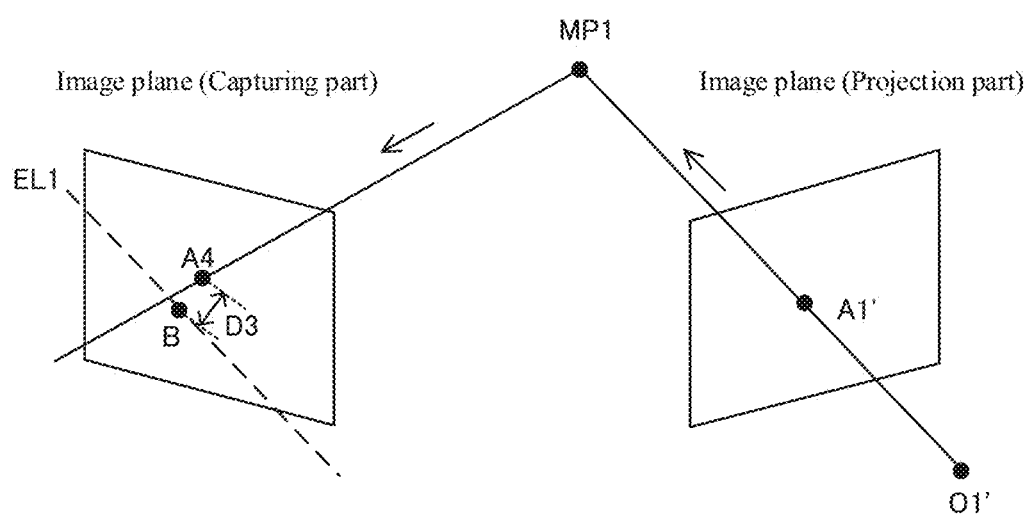
FIG. 20 illustrates a method for correcting correspondence by the defective pixel detecting part.

The defective pixel detection part 502 may instruct the analyzing part 305 to modify the correspondence estimated by the analyzing part 305. For example, when the defective pixel detection part 502 detects that the distance between (i) the captured pixel position that the analyzing part 305 estimated to have correspondence with the projection pixel position and (ii) the first epipolar line corresponding to this projection pixel is less than or equal to the first threshold value, the defective pixel detection part 502 instructs the analyzing part 305 to estimate that a position on the first epipolar line that is closest to the captured pixel position and the projection pixel position have correspondence with each other. FIG. 20 is a drawing for explaining a method for modifying the correspondence by the defective pixel detection part 502.

It is assumed in FIG. 20 that a distance D3 between (i) the captured pixel position A4 that the analyzing part 305 estimated to have correspondence with the projection pixel position A1' and (ii) the first epipolar line EL1 corresponding to the projection pixel position A1' is less than or equal to the first threshold value. In this case, the defective pixel detection part 502 instructs the analyzing part 305 to estimate that the captured pixel position B closest to the captured pixel position A4 on the first epipolar line has correspondence with the projection pixel position A1'. In this case, the defective pixel detection part 502 causes the analyzing part 305 to disregard the original estimation result that the projection pixel position A1' and the captured pixel position A4 have correspondence with each other.

The estimation of the correspondence between the projection pixel position and the captured pixel position tend to have a measurement error due to influences of external light or the like. On the other hand, the correspondence between a captured pixel position and the first epipolar line of the capturing part 2 can be measured in advance, and so the reliability of the measurement result is rather high. Therefore, the analyzing part 305 can reduce the measurement error due to influences of external light or the like, when the captured pixel position A4 that the analyzing part 305 estimated to have correspondence with the projection pixel position A1' deviates from the epipolar line by the distance D3, by modifying the correspondence estimated by the analyzing part 305 so that this captured pixel position is changed to be on an epipolar line.

Similarly, for example, when the defective pixel detection part 502 detects that the distance between (i) the projection pixel position that the analyzing part 305 estimated to have correspondence with the captured pixel position and (ii) the second epipolar line corresponding to this captured pixel is less than or equal to the second threshold value, the defective pixel detection part 502 may instruct the analyzing part 305 to estimate that the position based on this projection pixel position and the captured pixel position have correspondence with each other on the second epipolar line. For example, the defective pixel detection part 502 may instruct the analyzing part 305 to estimate that the position closest to the projection pixel position on the second epipolar line has correspondence with the captured pixel position.

The geometry identification part 306 obtains a 3D geometry of the object to be measured, similarly to the first embodiment, on the basis of the correspondence between the captured pixel position and the projection pixel position obtained by the analyzing part 305. The geometry identification part 306 obtains locations of defective pixels detected by the defective pixel detection part 502, and identifies the 3D geometry on the basis of the correspondence after removing the correspondence of defective pixels detected by the defective pixel detection part 304 from among the plurality of pieces of correspondence obtained by the analyzing part 305.

[Processing Procedure of the 3D Geometry Measurement Apparatus 200]

Figure 21:
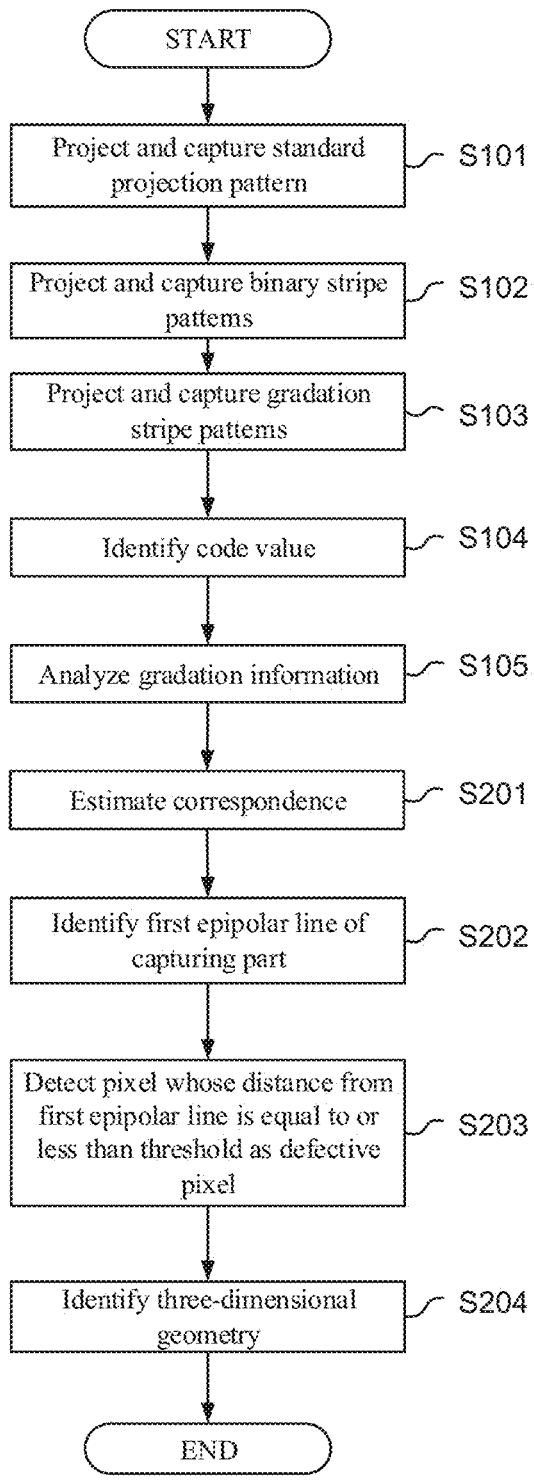
FIG. 21 is a flowchart showing an example of an operation of the 3D geometry measurement apparatus according to the second embodiment.

FIG. 21 shows an exemplary operation of the 3D geometry measurement apparatus 200 according to the second embodiment. This processing procedure starts when, for example, a user gives instructions to measure an object to be measured with the 3D geometry measurement apparatus 200 by using an un-shown operation key. The processing procedure of steps S101 to S105 is not explained because they are the same as the processing procedure of the steps S101 to S105 of FIG. 12.

The analyzing part 305 obtains the correspondence between a captured pixel position showing a position of a pixel in the captured image and a projection pixel position showing a position of a pixel in the projection image. Further, the analyzing part 305 obtains the correspondence between the captured pixel position and the projection pixel position by using a result of an analysis of the gradation information of the gradation stripe patterns obtained in the step S105. The analyzing part 305 estimates the correspondence between the captured pixel position and the projection pixel position by selecting a correspondence closest to the correspondence estimated by using a code value from among the correspondences obtained by the result of the analysis of the gradation information (S201). The line identification part 501 identifies the first epipolar line of the capturing part 2 corresponding to the projection pixel position (S202).

The defective pixel detection part 502 obtains the distance between the captured pixel position A2 that the analyzing part 305 estimated to have correspondence with the projection pixel position and the first epipolar line of the captured image corresponding to this projection pixel position, and compares the obtained distance to the first threshold value. The defective pixel detection part 502 detects pixels at the captured pixel position A2 as defective pixels if the distance between the captured pixel position and the first epipolar line is larger than or equal to the first threshold value. The defective pixel detection part 502 compares the distance between the captured pixel position and the first epipolar line for each correspondence estimated by the analyzing part 305 to the first threshold value, and detects the pixels whose distance from the captured pixel position is larger than or equal to the first threshold value (S203) as defect pixels. The geometry identification part 306 identifies the 3D geometry of the object to be measured on the basis of the correspondence of pixels excluding the defective pixels detected by the defective pixel detection part 304, and finishes the processing (S204).

According to the present embodiment, the defective pixel detection part 304 detects defective pixels on the basis of the positional relationship between the captured pixel positions and the first epipolar line, or the positional relationship between the projection pixel positions and the second epipolar line. Because the position of epipolar lines is specified by the arrangement of the capturing part 2 and the projection part 1, the positions of epipolar lines can be measured in advance. Therefore, the 3D geometry measurement apparatus can simplify the process of detecting defective pixels by detecting the defective pixels using an epipolar line.

It should be noted that, in the present embodiment, an example was explained where the projection control part 301 projects the projection image including a stripe pattern extending in the first direction and the projection image including a stripe pattern extending in the second direction, and where the first direction and the second direction are orthogonal to each other. However, the present invention is not limited to this. For example, the first direction and the second direction may be approximately orthogonal to each other. The first direction can be arbitrary as long as it is different from the direction corresponding to the angle shown in FIG. 2B. The second direction can be any direction that is different from the first direction.

Third Embodiment

In the first and second embodiments, the projection control part 301 projects projection patterns for a space coding method and a phase shift method as the projection patterns in a horizontal direction and a vertical direction. That is, the projection control part 301 projects a projection image having a stripe pattern extending in the first direction and a projection image having a stripe pattern extending in the second direction as stripe patterns exhibiting sinusoidal luminance distributions. Also, the projection control part 301 projects a projection image having a stripe pattern extending in the first direction and a projection image having a stripe pattern extending in the second direction as stripe patterns with two values.

The present invention, however, is not limited to this. For example, the projection control part 301 may project only a projection pattern for a phase shift method with respect to a projection pattern in the horizontal direction. In this case, the projection control part 301 projects a projection image having a stripe pattern exhibiting a sinusoidal luminance distribution as a stripe pattern extending in the second direction, and does not project a projection image having a stripe pattern with two values onto the object to be measured.

When the projection control part 301 projects a projection pattern in the horizontal direction, the analyzing part 305 obtains a phase value $I_{RP,2}$ (I, j). In this case, the absolute phase value of the projection pattern in the horizontal direction can be expressed as $$I_{AR,2} = 2\pi m + I_{RP,2}(i,j) \tag{Equation A},$$

and a plurality of candidates can be can be considered. There are a plurality of candidates of projection pixel positions having correspondence with the captured pixel positions, as shown in the equations shown below:

$$(i_p, j_p(m)) = \left(\frac{p_1 I_{AP,1}(i,j)}{2\pi}, \frac{p_2 I_{AP,2}(i,j,m)}{2\pi}\right), \tag{Equation B}$$

where $i_p$ and $j_p(m)$ show the $i_p$-th pixel from the left edge in the second direction and the $j_p(m)$-th pixel from the top edge in the first direction respectively.

Figure 22:
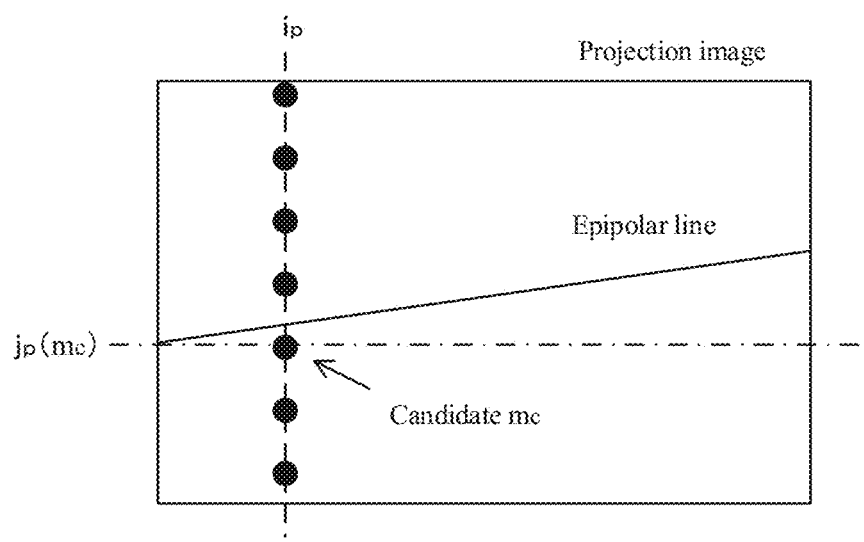
FIG. 22 illustrates a method for estimating correspondence between a captured pixel position and a projection pixel position by an analyzing part according to the third embodiment.

The analyzing part 305 estimates that the projection pixel position closest to the second epipolar line of the projection part 1 corresponding to the captured pixel position among projecting pixel positions of the pixels exhibiting luminance of the same phase in a stripe pattern as the captured image to have correspondence with the captured pixel position. FIG. 22 is a drawing to explain a method for estimating correspondence between the captured pixel position and the projection pixel position by the analyzing part 305 of the third embodiment. The plurality of black circles in FIG. 22 respectively show a plurality of projection pixels exhibiting the same phase as the pixels at the captured pixel position.

The analyzing part 305 identifies projection pixels exhibiting the same phase as the pixels at the captured pixel positions by analyzing gradation information of the gradation stripe pattern in the captured image. As shown in black circles in FIG. 22, there are a plurality of projection pixels exhibiting luminance with the same phase as the pixels of the captured pixel position. Therefore, the analyzing part 305 obtains the projection pixel locations of these pixels as candidates of projection pixel positions having correspondence with the captured pixel positions. Among these candidates, the analyzing part 305 estimates that the candidate closest to the second epipolar line corresponding to the captured pixel position has correspondence with the captured pixel position.

The analyzing part 305 estimates the projection pixel position $(i_p, j_p(m_c))$ having correspondence with the captured pixel position by selecting $m_c$ corresponding to the pixel closest to the second epipolar line of the corresponding projection part as a value of m in Equation B, as shown in the equation below:

$$(i_p, j_p(m_c)) = \left( \frac{p_1 I_{AP,1}(i, j)}{2\pi}, \frac{p_2 I_{AP,2}(i, j, m_c)}{2\pi} \right)$$

Because the analyzing part 305 estimates the projection pixel position having correspondence with the captured pixel position by using an epipolar line with such configurations, the analyzing part 305 can reduce the number of projection images that the projection control part 301 projects onto the object to be measured. As a result, the analyzing part 305 can shorten measurement times.

A stripe pattern extending in the second direction does not cause the phase to change significantly depending on the presence of an object to be measured. Therefore, for example, measuring positions of stripes extending in the second direction of the captured image in advance when a projection image including a stripe pattern extending in the second direction is projected to a plane plate enables identification of an approximate position of the stripe pattern extending in the direction of the captured image. The value of the integer m (or approximate value) in the above Equations A and B may be obtained before the measurement of the object to be measured by using information showing positions of stripes extending in the second direction. By doing this, processing while measuring an actual object to be measured can be simplified.

It should be noted that an example of the case where the pixel closest to the second epipolar line of the projection part 1 corresponding to the captured pixel position is estimated to be the pixel having correspondence with the pixel at the captured pixel position among the pixels of the projecting pixel position exhibiting luminance of the same phase with the captured pixel position in a stripe pattern by the analyzing part 305 was explained. The present invention, however, is not limited to this. For example, the analyzing part 305 may obtain a plurality of the first epipolar lines on the respective captured images for a plurality of projection pixel positions having the same phase value as the captured pixel position in a stripe pattern and may estimates that the projection pixel position corresponding to the first epipolar line closest to the captured pixel position has correspondence with the captured pixel position.

Further, the projection control part 301 may project projection images whose periods of the stripe pattern extending in the second direction are different from each other, and the analyzing part 305 may estimate the correspondence between the captured pixel position and the projection pixel position for each projection image. In this case, if the analyzing part 305 estimated the correspondence between the captured pixel position and the projection pixel position for each projection image, the defective pixel detection part 502 detects, as defective pixels, pixels at the captured pixel position and the projection pixel position whose correspondence estimated by the analyzing part 305 has changed.

Further, the 3D geometry measurement apparatus may have a configuration that includes a plurality of capturing parts or a plurality of projection parts. Even when the 3D geometry measurement apparatus includes the plurality of capturing parts or the plurality of projection parts, an epipolar line of a projection pixel corresponding to a certain captured pixel position is uniquely determined if a pair of a capturing part and a projection part is designated. Therefore, the defective pixel detection part 502 can detect defective pixels on the basis of the positional relationship between the captured pixel position and the first epipolar line or the positional relationship between the projection pixel position and the second epipolar line, similarly to the configuration where the 3D geometry measurement apparatus has one capturing part and one projection part.

Also, the 3D geometry can be obtained by obtaining pixels that correspond with each other between a pair of the capturing parts if one projection part and a plurality of the capturing parts are used. In such a case, the 3D geometry of an object to be measured can be obtained by removing defective pixels identified by the defective pixel detecting part according to the first to third embodiment.

Also, in the second embodiment, the example of the case where the defective pixel detection part 502 detects the defective pixels on the basis of the distance between the projection pixel position and the second epipolar line on the projection image plane of the projection part was explained. Also, the example of the case where the defective pixel detection part 502 detects the defective pixels on the basis of the distance between the captured pixel position and the first epipolar line on the captured image plane of the capturing part was explained. However, the present invention is not limited to the configuration of detecting the defective pixels. For example, the 3D geometry measurement apparatus may include a determination part that performs various determinations on the basis of statistics of (i) the distance between the captured pixel position and the first epipolar line or (ii) the distance between the projection pixel position and the second epipolar line.

The determination part determines that an alignment state of the projection part 1 and the capturing part 2 is not appropriate when statistics of the distance between the captured pixel position and the first epipolar line exceed an allowable value. For example, the determination part obtains respective distances between (i) the captured pixel position that the analyzing part 305 estimated to have correspondence with the projection pixel position and (ii) the first epipolar line corresponding to this projection pixel position for a randomly selected plurality of projection pixel positions, and calculates an average value of the obtained distances. When the calculated average value exceeds the allowable value, the determination part may self-diagnose that the alignment state of the orientation of the optical axes or the like of the projection part 1 and the capturing part 2 is not appropriate. In this case, the determination part may display on a display part (not shown) a message being stored in the memory part 4 indicating that a calibration of the position or the like of the epipolar line corresponding to each of the captured pixel position and the projection pixel position needs to be made. Taking the desired accuracy of measurement into accounts, the allowable value is specified by a person skilled in the art, as appropriate.

Similarly, the determination part determines that an alignment state of the projection part 1 and the capturing part 2 is not appropriate when statistics of the distance between the projection pixel position and the second epipolar line exceeds the allowable value. The determination part obtains respective distances between (i) the projection pixel position that the analyzing part 305 estimated to have correspondence with the captured pixel position and (ii) the second epipolar line corresponding to this captured pixel position for a randomly selected plurality of captured pixel positions, and calculates an average value of the obtained distances. When the calculated average value exceeds the allowable value, the determination part may self-diagnose that the alignment state of the orientation of the optical axes or the like of the projection part 1 and the capturing part 2 is not appropriate. In this case, the determination part may display on a display part (not shown) the message being stored in the memory part 4 indicating that the calibration of the position or the like of the epipolar line corresponding to each of the captured pixel position and the projection pixel position needs to be made.

The present invention is explained on the basis of the exemplary embodiments. The technical scope of the present invention is not limited to the scope explained in the above embodiments and it is possible to make various changes and modifications within the scope of the invention. For example, the specific embodiments of the distribution and integration of the apparatus are not limited to the above embodiments, all or part thereof, can be configured with any unit which is functionally or physically dispersed or integrated. Further, new exemplary embodiments generated by arbitrary combinations of them are included in the exemplary embodiments of the present invention. Further, effects of the new exemplary embodiments brought by the combinations also have the effects of the original exemplary embodiments.

What is claimed is:

1. A three-dimensional (3D) geometry measurement apparatus wherein the 3D geometry measurement apparatus measures a 3D geometry of an object to be measured by projecting a projection image including a stripe pattern onto the object to be measured, the apparatus comprising:
   a projection part that projects the projection image onto the object to be measured;
   a capturing part that generates a captured image of the object to be measured onto which the projection image is projected;
   an analyzing part that obtains correspondences between projection pixel positions that are pixel positions of the projection image and captured pixel positions that are pixel positions of the captured image;
   a line identification part that identifies a first epipolar line of the capturing part corresponding to the captured pixel positions or a second epipolar line of the projection part corresponding to the projection pixel positions;
   a defective pixel detection part that detects defective pixels on the basis of a positional relationship between the captured pixel positions and the first epipolar line or a positional relationship between the projection pixel positions and the second epipolar line; and
   a geometry identification part that identifies the 3D geometry of the object to be measured on the basis of correspondence of pixel positions excluding the positions of defective pixels detected by the defective pixel detection part from among the correspondences obtained by the analyzing part.

2. The 3D geometry measurement apparatus according to claim 1, wherein the defective pixel detection part detects a pixel at the captured pixel position as a defective pixel or the projection pixel position as a defective pixel when a distance between the captured pixel position and the first epipolar line corresponding to a projection pixel position having correspondence with the captured pixel position or a distance between the projection pixel position and the second epipolar line corresponding to a captured pixel position having correspondence with the projection pixel position is larger than a threshold value.

3. The 3D geometry measurement apparatus according to claim 1, wherein the analyzing part estimates that a position on the first epipolar line that is closest to the captured pixel position and the projection pixel position have correspondence with each other when the distance between the captured pixel position and the first epipolar line corresponding to the projection pixel position having correspondence with the captured pixel position is equal to or less than the threshold value.

4. The 3D geometry measurement apparatus according to claim 1, wherein the projection part projects a projection image containing pixels excluding the defective pixels detected by the defective pixel detection part from among a plurality of pixels included in the projection image onto the object to be measured, and the analyzing part estimates correspondence between (i) the projection pixel positions of the projection image excluding the defective pixels projected by the projection part (1) and (ii) the captured pixel position of the captured image of the object to be measured onto which the projection image excluding the defective pixels is projected.

5. The 3D geometry measurement apparatus according to claim 1, wherein the projection part projects an image including the defective pixels detected by the defective pixel detection part, among a plurality of pixels included in the projection image, onto the object to be measured, and the analyzing part estimates correspondences between (i) the projection pixel positions of the image including the defective pixels projected by the projection part (1) and (ii) the captured pixel positions of the captured image of the object to be measured onto which the image including the defective pixels is projected.

6. The 3D geometry measurement apparatus according to claim 1, wherein if the analyzing part estimates that one projection pixel position of the projection image corresponds to a plurality of the captured image pixel positions, the defective pixel detection part detects a pixel of at least one of the plurality of captured image pixel positions corresponding to the one projection pixel position as the defective pixel.

7. The 3D geometry measurement apparatus according to claim 1, wherein if the analyzing part estimates that one projection pixel position of the projection image corresponds to a plurality of captured image pixel positions on the first epipolar line of the capturing part identified by the line identification part, the defective pixel detection part detects a pixel of at least one of the plurality of captured image pixel positions corresponding to the one projection pixel position as the defective pixel.

8. The 3D geometry measurement apparatus according to claim 1, wherein the projection part projects a projection image including the stripe pattern extending in a first direction which is orthogonal to a plane containing an optical axis of the capturing part and an optical axis of the projection part, and a projection image including the stripe pattern extending in a second direction which is parallel to a plane including the optical axis of the projection part and the optical axis of the capturing part.

9. The 3D geometry measurement apparatus according to claim 1, wherein the projection part projects the projection image including the stripe pattern both extending in the second direction which is parallel to the plane including the optical axis of the projection part and the optical axis of the capturing part onto the object to be measured, and
the defective pixel detection part detects a pixel of the stripe pattern extending in the second direction in the captured image of the object to be measured onto which the projection image is projected as the defective pixel when a phase of the pixel or an amount of phase change between pixels is outside a standard range.

10. The 3D geometry measurement apparatus according to claim 1, wherein the capturing part and the projection part are arranged so that the first epipolar lines of the capturing part identified by the line identification part do not cross in the captured image.

11. The 3D geometry measurement apparatus according to claim 1, wherein the capturing part and the projection part are arranged so that the second epipolar lines of the projection part identified by the line identification part do not cross in the projection image.

12. The 3D geometry measurement apparatus according to claim 1, wherein the projection part projects a projection image including the stripe pattern with binary images and a projection image including the stripe pattern with sinusoidal luminance distributions onto the object to be measured.

13. The 3D geometry measurement apparatus according to claim 1, wherein the projection part sequentially projects projection images including the stripe pattern whose cycles of stripes are different from each other.

14. The 3D geometry measurement apparatus according to claim 1, wherein the projection part projects the stripe pattern, and
the analyzing part estimates that a pixel closest to the second epipolar line of the projection part corresponding to the captured pixel position is a pixel having correspondence with a pixel at the captured pixel position among a plurality of pixels exhibiting luminance of the same phase with the captured pixel position in the stripe pattern.

15. The 3D geometry measurement apparatus according to claim 1, further comprising
a determination part that determines that an alignment state of the projection part and the capturing part is not appropriate when statistics of (i) the distance between the captured pixel position and the first epipolar line or (ii) the distance between the projection pixel position and the second epipolar line exceed an allowable value.

16. A three-dimensional (3D) geometry measurement method wherein the 3D geometry measurement method measures a 3D geometry of an object to be measured by projecting a projection image including a stripe pattern onto the object to be measured, the method comprising:
projecting the projection image onto the object to be measured;
generating a captured image of the object to be measured onto which the projection image is projected;
obtaining correspondence between projection pixel positions that are pixel positions of the projection image and a captured pixel positions that are pixel positions of the captured image;
identifying a first epipolar line of a capturing part corresponding to the captured pixel positions or a second epipolar line of a projection part corresponding to the projection pixel positions, the capturing part generating the captured image of the object to be measured and the projection part projecting the projection image onto the object to be measured;
detecting a defective pixel on the basis of a positional relationship between the projection pixel position and the first epipolar line or a positional relationship between the projection pixel position and the second epipolar line; and
identifying the 3D geometry of the object to be measured on the basis of correspondence of pixel positions excluding the positions of defective pixels detected from among the correspondences being obtained.

17. A 3D geometry measurement apparatus including:
a projection part that projects a projection image including stripe patterns extending in a plurality of directions onto an object to be measured;
a capturing part that respectively generates captured images including the stripe patterns projected onto the object to be measured by the projection part;
a feature amount identification part that identifies a feature amount indicating the stripe patterns included in the captured image;
the defective pixel detection part that detects defective pixels in the captured image based on the feature amount identified from each of the captured images of the stripe patterns extending in respective directions; and
a geometry identification part that identifies a 3D geometry of the object to be measured for pixels of the captured image excluding the defective pixels.

18. The 3D geometry measurement apparatus according to claim 17, wherein the defective pixel detection part detects the pixels in the captured image as the defective pixel based on a change in a feature amount obtained for each of the directions.

19. The 3D geometry measurement apparatus according to claim 17, wherein the projection part projects the projection image including the stripe patterns extending in directions different from the already-projected directions onto the object to be measured when a range of the defective pixel detected by the defective pixel detection part is outside the predetermined range.

20. The 3D geometry measurement apparatus according to claim 17, wherein the projection part projects the projection image including the stripe patterns extending in a second direction onto the object to be measured when a range of the defective pixel detected based on a first feature amount identified from the captured image of stripe patterns extending in a first direction is more than the standard range.

* * * * *